United States Patent
Shangguan et al.

(10) Patent No.: US 11,862,768 B2
(45) Date of Patent: Jan. 2, 2024

(54) WINDING TYPE ELECTRODE ASSEMBLY, BATTERY CELL, BATTERY AND POWER CONSUMPTION DEVICE

(71) Applicant: CONTEMPORARY AMPEREX TECHNOLOGY CO., LIMITED, Ningde (CN)

(72) Inventors: Huihui Shangguan, Ningde (CN); Daichun Tang, Ningde (CN); Xinxin Du, Ningde (CN); Ziyu Bai, Ningde (CN); Ruihuan Qin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 59 days.

(21) Appl. No.: 17/547,535

(22) Filed: Dec. 10, 2021

(65) Prior Publication Data

US 2022/0285737 A1     Sep. 8, 2022

Related U.S. Application Data

(63) Continuation of application No. PCT/CN2021/079604, filed on Mar. 8, 2021.

(51) Int. Cl.
*H01M 10/0587* (2010.01)
*H01M 50/538* (2021.01)

(52) U.S. Cl.
CPC ..... *H01M 10/0587* (2013.01); *H01M 50/538* (2021.01); *H01M 2220/20* (2013.01)

(58) Field of Classification Search
CPC ........... H01M 10/0587; H01M 50/538; H01M 2220/20

(Continued)

(56) References Cited

U.S. PATENT DOCUMENTS

2012/0321946 A1* 12/2012 Kim ................ H01M 4/02
                                                        29/623.5
2013/0157090 A1   6/2013 Kuroda
(Continued)

FOREIGN PATENT DOCUMENTS

CN    102263256 A    11/2011
CN    111326699 A     6/2020
(Continued)

OTHER PUBLICATIONS

English language machine translation of "Battery" in JP 2006079942 by Teranashi Tadashi et al. (Year: 2006).*

(Continued)

*Primary Examiner* — Jonathan G Jelsma
*Assistant Examiner* — Omar M Kekia
(74) *Attorney, Agent, or Firm* — Scully, Scott, Murphy & Presser, P.C.

(57) ABSTRACT

The embodiments of the present application provide a winding type electrode assembly including a positive electrode plate and a negative electrode plate; the positive electrode plate includes a first positive winding end portion and a positive winding middle section; the negative electrode plate includes a first portion and a second portion; and an active material layer of the negative electrode plate exceeds an active material layer of the positive electrode plate, and a difference between a maximum width of a negative active material layer of the first portion and a minimum width of a positive active material layer of the first positive winding end portion is larger than a difference between a maximum width of a negative active material layer of the second portion and a minimum width of a positive active material layer of the positive winding middle section.

17 Claims, 20 Drawing Sheets

(58) Field of Classification Search
USPC .......................................................... 429/211
See application file for complete search history.

(56) References Cited

U.S. PATENT DOCUMENTS

2017/0244129 A1* 8/2017 Seong ................ H01M 10/0431
2018/0013123 A1* 1/2018 Ito ........................ H01M 50/553

FOREIGN PATENT DOCUMENTS

| CN | 212161994 U | 12/2020 |
| JP | 2006079942 A | 3/2006 |
| JP | 2014207201 A | 10/2014 |

OTHER PUBLICATIONS

English language machine translation of "Negative Plate and Battery" in "CN 102263256" by Li Wenliang et al. (Year: 2014).*
Extended European Search report dated Jun. 15, 2022 received in European Patent Application No. EP 21816298.0.

* cited by examiner

WINDING TYPE ELECTRODE ASSEMBLY, BATTERY CELL, BATTERY AND POWER CONSUMPTION DEVICE

CROSS-REFERENCE TO RELATED APPLICATIONS

This application is a continuation of International Application No. PCT/CN2021/079604, filed on Mar. 8, 2021, the disclosure of which is hereby incorporated by reference in its entirety.

TECHNICAL FIELD

The present application relates to the technical field of batteries, and particularly relates to a winding type electrode assembly, a battery cell, a battery, a power consumption device and a method and a device for manufacturing an electrode assembly.

BACKGROUND

Lithium ion batteries have become mainstream products of secondary batteries due to their outstanding advantages such as high energy density and good cycle performance. Besides, they are widely used in portable electrical appliances, power vehicles, mobile phones, spacecraft and other fields.

Graphite or silicon is commonly used as a negative material of a battery. Because its lithiation electric potential is close to that of metallic lithium, the phenomenon of lithium plating is likely to occur under certain conditions, which seriously affects cycle performance of the lithium ion batteries. Even in serious cases, it may cause safety problems such as short circuit in the battery due to lithium dendrites formed by the lithium plating.

SUMMARY

The embodiments of the present application provide a winding type electrode assembly, a battery cell, a battery, a power consumption device and a method and an apparatus for manufacturing an electrode assembly, thus solving a problem of lithium plating of a battery.

In a first aspect, the embodiments of the present application provide a winding type electrode assembly, which includes a positive electrode plate and a negative electrode plate, where the positive electrode plate includes a first positive winding end portion and a positive winding middle section connected to each other; the negative electrode plate includes a first portion and a second portion connected to each other, the first portion is arranged opposite to the first positive winding end portion, and the second portion is arranged opposite to the positive winding middle section; and in a winding axial direction of the winding type electrode assembly, a negative active material layer of the negative electrode plate exceeds a positive active material layer of the positive electrode plate, a maximum width of a negative active material layer of the first portion is H1, a minimum width of a positive active material layer of the first positive winding end portion is L1, a maximum width of a negative active material layer of the second portion is H2, a minimum width of a positive active material layer of the positive winding middle section is L2, and H1−L1>H2−L2.

In the above technical solution, a width difference between the maximum width of the negative active material layer of the first portion and the minimum width of the positive active material layer of the first positive winding end portion is set to be larger than a width difference between the maximum width of the negative active material layer of the second portion and the minimum width of the positive active material layer of the positive winding middle section, that is, a maximum width difference between the positive active material layer of the first positive winding end portion and the negative active material layer of the first portion is larger than a maximum width difference between the negative active material layer of the second portion and the positive active material layer of the positive winding middle section, so that the risk of the lithium plating caused by the reason that a size of a part, exceeding the positive active material layer of the positive electrode plate in the winding axial direction, of the negative active material layer of the negative electrode plate does not meet a design requirement is reduced.

In some embodiments of the first aspect of the present application, H1>H2.

In the above technical solution, due to the reason that the first portion is arranged opposite to the first positive winding end portion and the second portion is arranged opposite to the positive winding middle section, the maximum width of the negative active material layer of the first portion is larger than the maximum width of the negative active material layer of the second portion, which means that a width of the negative active material layer of the first portion is increased compared with that of the negative active material layer of the second portion, so that on the premise of guaranteeing energy density, the risk of the lithium plating caused by the reason that the size of the part, exceeding the positive active material layer of the positive electrode plate in the winding axial direction, of the negative active material layer of the negative electrode plate does not meet the design requirement may be reduced.

In some embodiments of the first aspect of the present application, a minimum width of the negative active material layer of the first portion is H3, where H3≥H2.

In the above technical solution, the minimum width of the negative active material layer of the first portion is not less than the maximum width of the negative active material layer of the second portion, so that the problem of the lithium plating caused by the reason that a size of a part, exceeding the positive active material layer of the first positive winding end portion in the winding axial direction, of the negative active material layer of the first portion does not meet the design requirement is avoided.

In some embodiments of the first aspect of the present application, 0.3 mm≤H1−H2≤3 mm.

In the above technical solution, in the winding axial direction, if the width of the negative active material layer of the first portion is too large, it is possible that the width exceeds a width of a separator film and the negative active material layer further interferes with a top cover assembly, increasing the short circuit risk. If the width of the negative active material layer of the first portion is not enough, the size of the part, exceeding the positive active material layer of the positive electrode plate in the winding axial direction, of the negative active material layer of the negative electrode plate cannot meet the design requirement. Therefore, 0.3 mm≤H1−H2≤3 mm may guarantee use safety of the winding type electrode assembly and further reduce the risk of the lithium plating caused by the reason that the size of the part, exceeding the positive active material layer of the positive electrode plate in the winding axial direction, of the negative active material layer of the negative electrode plate does not meet the design requirement.

In some embodiments of the first aspect of the present application, in the winding axial direction, one end of the negative active material layer of the first portion at least partially exceeds a corresponding end of the negative active material layer of the second portion, and the other end of the negative active material layer of the first portion is flush with the other end of the negative active material layer of the second portion.

In the above technical solution, in the winding axial direction, one end of the negative active material layer of the first portion at least partially exceeds the corresponding end of the negative active material layer of the second portion, and the other end of the negative active material layer of the first portion is flush with the other end of the negative active material layer of the second portion, so that the negative active material layer of the first portion is widened from one side in the winding axial direction compared with the negative active material layer of the second portion, a forming mode of the negative electrode plate is simple, and processing difficulty is reduced.

In some embodiments of the first aspect of the present application, the negative electrode plate further includes a negative tab, in the winding axial direction, the negative tab is located at one end of the negative electrode plate, and one end of the negative active material layer of the first portion close to the negative tab at least partially exceeds a corresponding end of the negative active material layer of the second portion.

In the above technical solution, in the winding axial direction, one end of the negative active material layer of the first portion close to the negative tab at least partially exceeds the corresponding end of the negative active material layer of the second portion, so that in a process of forming the negative tab through die cutting, the negative electrode plate with a width difference between the negative active material layer of the first portion and the negative active material layer of the second portion may be formed, that is, the negative electrode plate with the width difference between the negative active material layer of the first portion and the negative active material layer of the second portion may be formed by using an original forming process of the negative electrode plate.

In some embodiments of the first aspect of the present application, the negative electrode plate further includes a negative tab, in the winding axial direction, the negative tab is located at one end of the negative electrode plate, one end of the first portion close to the negative tab exceeds a corresponding end of the second portion, and the other end of the first portion is flush with the other end of the second portion.

In the above technical solution, in the winding axial direction, the end of the first portion close to the negative tab exceeds the corresponding end of the second portion, and the other end of the first portion is flush with the other end of the second portion, so that in the process of forming the negative tab through the die cutting, the negative electrode plate with a width difference between the first portion and the second portion may be formed, that is, the negative electrode plate with the width difference between the first portion and the second portion may be formed by using the original forming process of the negative electrode plate.

In some embodiments of the first aspect of the present application, in a winding direction, the first portion is provided with a connection surface connected to the second portion; and negative tabs are multiple in quantity, one of the multiple negative tabs protrudes out of the first portion in the winding axial direction and is provided with a first side face close to the second portion, and the first side face and the connection surface are coplanar.

In the above technical solution, if the connection surface of the first portion and one side face of the negative tab are coplanar, the connection surface is not located between the two negative tabs, so that a situation that a connection position of the first portion and the second portion warps and then punctures the separator film due to the width difference between the first portion and the second portion during and after winding may be avoided.

In some embodiments of the first aspect of the present application, in the winding axial direction, the negative tab protruding out of the first portion is provided with a negative active material layer, and the negative active material layer on the negative tab protruding out of the first portion is connected to the negative active material layer of the first portion.

In the above technical solution, the negative active material layer on the negative tab protruding out of the first portion is connected to the negative active material layer of the first portion, which means that a width of a negative active material layer at part position of the first portion is further increased, so that the risk of the lithium plating caused by the reason that the size of the part, exceeding the positive active material layer of the positive electrode plate in the winding axial direction, of the negative active material layer of the negative electrode plate does not meet the design requirement may be further reduced.

In some embodiments of the first aspect of the present application, the winding type electrode assembly includes a straight area and two bent areas, and the two bent areas are connected to two ends of the straight area respectively; and the first portion passes through the straight area at least two times.

In the above technical solution, after the first portion passes through the straight area two times, a possibility of relative deviation between the first positive winding end portion and the first portion is small, so the first portion passes through the straight area at least two times, which may reduce the risk of the lithium plating caused by the reason that the size of the part, exceeding the positive active material layer of the positive electrode plate in the winding axial direction, of the negative active material layer of the negative electrode plate does not meet the design requirement due to the relative deviation between the first positive winding end portion and the first portion as much as possible.

In some embodiments of the first aspect of the present application, the positive electrode plate further includes a second positive winding end portion, and the first positive winding end portion and the second positive winding end portion are connected to two ends of the positive winding middle section respectively; the negative electrode plate further includes a third portion, the first portion and the third portion are connected to two ends of the second portion respectively, and the third portion is arranged opposite to the second positive winding end portion; and a maximum width of a negative active material layer of the third portion is H4, a minimum width of a positive active material layer of the second positive winding end portion is L3, and H4−L3>H2−L2.

In the above technical solution, the positive electrode plate further includes the second positive winding end portion, the negative electrode plate further includes the third portion, and the second positive winding end portion is arranged opposite to the third portion. The maximum width difference between the positive active material layer of the first positive winding end portion and the negative active material layer of the first portion is larger than the maximum width difference between the negative active material layer of the second portion and the positive active material layer of the positive winding middle section, and a maximum width difference between the positive active material layer of the second positive winding end portion and the negative active material layer of the third portion is larger than a maximum width difference between the negative active material layer of the second portion and the positive active material layer of the positive winding middle section, so that the risk of the lithium plating caused by the reason that the size of the part, exceeding the positive active material layer of the positive electrode plate in the winding axial direction, of the negative active material layer of the negative electrode plate does not meet the design requirement may be reduced.

In some embodiments of the first aspect of the present application, H4>H2.

In the above technical solution, due to the reason that the third portion is arranged opposite to the second positive winding end portion and the second portion is arranged opposite to the positive winding middle section, the maximum width of the negative active material layer of the third portion is larger than the maximum width of the negative active material layer of the second portion, which means that a width of the negative active material layer of the third portion is increased compared with the negative active material layer of the second portion, so that on the premise of guaranteeing the energy density, the risk of the lithium plating caused by the reason that the size of the part, exceeding the positive active material layer of the positive electrode plate in the winding axial direction, of the negative active material layer of the negative electrode plate does not meet the design requirement may be reduced.

In some embodiments of the first aspect of the present application, a minimum width of the negative active material layer of the third portion is H5, where H5≥H2.

In the above technical solution, the minimum width of the negative active material layer of the third portion is not less than the maximum width of the negative active material layer of the second portion, so that the risk of the lithium plating caused by the reason that the size of the part, exceeding the positive active material layer of the positive electrode plate in the winding axial direction, of the negative active material layer of the negative electrode plate does not meet the design requirement is reduced.

In some embodiments of the first aspect of the present application, a maximum width of the positive active material layer of the first positive winding end portion is L4, a maximum width of the positive active material layer of the positive winding middle section is L5, and L4<L5.

In the above technical solution, the maximum width of the positive active material layer of the first positive winding end portion is less than the maximum width of the positive active material layer of the positive winding middle section, so that the maximum width difference between the positive active material layer of the first positive winding end portion and the negative active material layer of the first portion is larger than the maximum width difference between the negative active material layer of the second portion and the positive active material layer of the positive winding middle section, and by changing a width of the first positive winding end portion of the positive electrode plate, a possibility of the lithium plating caused by the reason that the size of the part, exceeding the positive active material layer of the positive electrode plate in the winding axial direction, of the negative active material layer of the negative electrode plate does not meet the design requirement is reduced.

In some embodiments of the first aspect of the present application, in the winding axial direction, one end of the positive active material layer of the positive winding middle section at least partially exceeds a corresponding end of the positive active material layer of the first positive winding end portion, and the other end of the positive active material layer of the positive winding middle section is flush with the other end of the positive active material layer of the first positive winding end portion.

In the above technical solution, in the winding axial direction, one end of the positive active material layer of the positive winding middle section at least partially exceeds the corresponding end of the positive active material layer of the first positive winding end portion, and the other end of the positive active material layer of the positive winding middle section is flush with the other end of the positive active material layer of the first positive winding end portion, so that the positive active material layer of the first positive winding end portion is widened from one side in the winding axial direction compared with the positive active material layer of the positive winding middle section, a forming mode of the positive electrode plate is simple, and processing difficulty is reduced.

In some embodiments of the first aspect of the present application, the positive electrode plate further includes a positive tab, in the winding axial direction, the positive tab is located at one end of the positive electrode plate, and one end of the positive active material layer of the positive winding middle section close to the positive tab at least partially exceeds a corresponding end of the positive active material layer of the first positive winding end portion.

In the above technical solution, one end of the positive active material layer of the positive winding middle section, close to the positive tab at least partially exceeds the corresponding end of the positive active material layer of the first positive winding end portion, so that in a process of forming the positive tab through die cutting, the positive electrode plate with a width difference between the positive active material layer of the first positive winding end portion and the positive active material layer of the positive winding middle section may be formed, that is, the positive electrode plate with the width difference between the positive active material layer of the first positive winding end portion and the positive active material layer of the positive winding middle section may be formed by using an original forming process of the positive electrode plate.

In a second aspect, the embodiments of the present application provide a battery cell, which includes the winding type electrode assembly provided according to any one of the embodiments of the first aspect.

In the above technical solution, the battery cell includes the winding type electrode assembly provided by any one of the embodiments of the first aspect, and a possibility of lithium plating of the battery cell caused by the reason that a size of a part, exceeding a positive active material layer of a positive electrode plate in a winding axial direction, of a negative active material layer of a negative electrode plate does not meet a design requirement is low.

In a third aspect, the embodiments of the present application provide a battery, which includes the battery cell provided by the embodiments of the second aspect.

In the above technical solution, the battery includes the battery cell provided by the embodiments of the second aspect, and a possibility of lithium plating of the battery caused by the reason that a size of a part, exceeding a positive active material layer of a positive electrode plate in a winding axial direction, of a negative active material layer of a negative electrode plate does not meet a design requirement is low.

In a fourth aspect, the embodiments of the present application provide a power consumption device, which includes the battery cell provided according to the embodiments of the second aspect.

In the above technical solution, the power consumption device includes the battery cell provided by the embodiments of the second aspect, and a possibility of lithium plating of the battery cell of the power consumption device caused by the reason that a size of a part, exceeding a positive active material layer of a positive electrode plate in a winding axial direction, of a negative active material layer of a negative electrode plate does not meet a design requirement is low.

In a fifth aspect, the embodiments of the present application provide a method for manufacturing a winding type electrode assembly, which includes: providing a positive electrode plate, the positive electrode plate including: a first positive winding end portion and a positive winding middle section connected to each other; providing a negative electrode plate, the negative electrode plate including: a first portion and a second portion connected to each other; and winding the positive electrode plate and the negative electrode plate to form the winding type electrode assembly, so as to enable the first portion to be arranged opposite to the first positive winding end portion, and enable the second portion to be arranged opposite to the positive winding middle section, where in a winding axial direction of the winding type electrode assembly, a negative active material layer of the negative electrode plate exceeds a positive active material layer of the positive electrode plate, a maximum width of a negative active material layer of the first portion is H1, a minimum width of a positive active material layer of the first positive winding end portion is L1, a maximum width of a negative active material layer of the second portion is H2, a minimum width of a positive active material layer of the positive winding middle section is L2, and H1−L1>H2−L2.

In the above technical solution, a width difference between the maximum width of the negative active material layer of the first portion of the provided negative electrode plate and the minimum width of the positive active material layer of the first positive winding end portion of the provided positive electrode plate is larger than a width difference between the maximum width of the negative active material layer of the second portion of the negative electrode plate and the minimum width of the positive active material layer of the positive winding middle section of the positive electrode plate, so that the risk of lithium plating caused by the reason that a size of a part, exceeding the positive active material layer of the positive electrode plate in the winding axial direction, of the negative active material layer of the negative electrode plate does not meet the design requirement due to relative deviation between the first portion and the first positive winding end portion caused by a winding technology, a winding device, etc. may be reduced.

In a sixth aspect, the embodiments of the present application provide a device for manufacturing a winding type electrode assembly, which includes: a first providing apparatus, a second providing apparatus and an assembling apparatus, where the first providing apparatus is configured to provide a positive electrode plate, the positive electrode plate including a first positive winding end portion and a positive winding middle section connected to each other; the second providing apparatus is configured to provide a negative electrode plate, the negative electrode plate including a first portion and a second portion connected to each other; and the assembling apparatus is configured to wind the positive electrode plate and the negative electrode plate, so as to enable the first portion to be arranged opposite to the first positive winding end portion, and enable the second portion to be arranged opposite to the positive winding middle section, in a winding axial direction of the winding type electrode assembly, a negative active material layer of the negative electrode plate exceeds a positive active material layer of the positive electrode plate, a maximum width of a negative active material layer of the first portion is H1, a minimum width of a positive active material layer of the first positive winding end portion is L1, a maximum width of a negative active material layer of the second portion is H2, a minimum width of a positive active material layer of the positive winding middle section is L2, and H1−L1>H2−L2.

In the above technical solution, in a process of forming the winding type electrode assembly through winding, the positive electrode plate and the negative electrode plate provided by the first providing apparatus and the second providing apparatus may reduce the risk of lithium plating caused by the reason that a size of a part, exceeding the positive active material layer of the positive electrode plate in the winding axial direction, of the negative active material layer of the negative electrode plate does not meet a design requirement.

BRIEF DESCRIPTION OF DRAWINGS

To describe the technical solutions in the embodiments of the present application more clearly, the following briefly describes the accompanying drawings required in the embodiments of the present application. Apparently, the accompanying drawings in the following descriptions show merely some embodiments of the present disclosure, and a person of ordinary skill in the art can still derive other accompanying drawings from these accompanying drawings without creative efforts.

Figure 1:
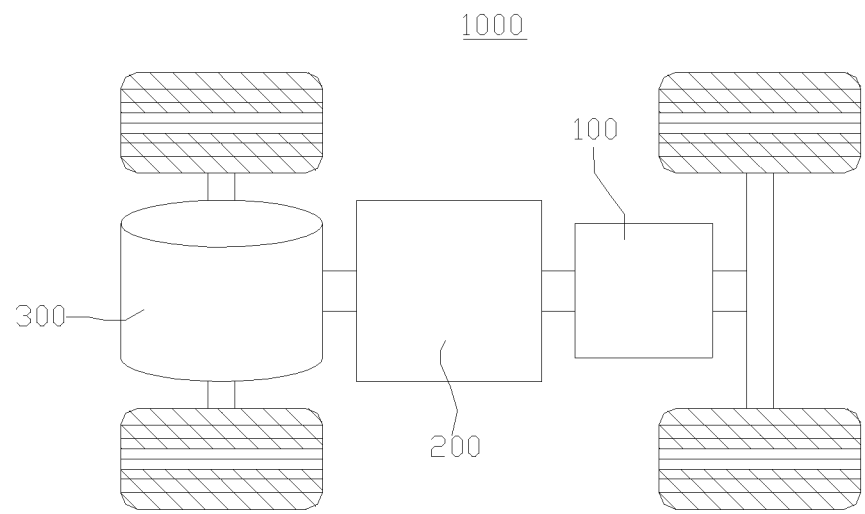
FIG. 1 is a structural schematic diagram of a vehicle provided by some embodiments of the present application.

In the accompanying drawings, the accompanying drawings are not drawn to actual scale.

Mark descriptions: 1000-vehicle; 100-battery; 10-box; 11-first box body portion; 12-second box body portion; 20-battery cell; 21-box body; 22-end cover assembly; 23-electrode assembly; 231-positive electrode plate; 2311-positive tab; 2312-positive body; 23121-first positive winding end portion; 23121a-positive active material layer of first positive winding end portion; 23122-positive winding middle section; 23122a-positive active material layer of positive winding middle section; 23121b-start end of positive winding starting section; 23121c-tail end of positive winding starting section; 23121d-tail end of positive winding ending section; 23121e-start end of positive winding ending section; 23121f-positive current collector of first positive winding end portion; 23123-second positive winding end portion; 23123a-positive active material layer of second positive winding end portion; 23123b-positive current collector of second positive winding end portion; 23124-insulating layer; 23124a-insulating layer of first positive winding end portion; 23124b-insulating layer of positive winding middle section; 23124c-insulating layer of second positive winding end portion; 232-negative electrode plate; 2321-negative tab; 2321a-first side face; 2321b-negative active material layer of negative tab; 2321c-second side face; 2322-negative body; 23221-first portion; 23221a-negative active material layer of first portion; 23221b-negative current collector of first portion; 23221c-connection surface; 23221d-start end of first portion; 23221e-tail end of first portion; 23222-second portion; 23222a-negative active material layer of second portion; 23222b-negative current collector of second portion; 23223-third portion; 23223a-negative active material layer of third portion; 23223b-start end of third portion; 23223c-tail end of third portion; 23223d-combining face; 23223e-negative current collector of third portion; 23224-first extending portion; 23225-second extending portion; 233-separator film; 200-controller; 300-motor; A-winding direction; B-winding axial direction; C-width direction; I-straight area; II-bent area; 400-device for manufacturing electrode assembly; 410-first providing apparatus; 420-second providing apparatus; and 430-assembling apparatus.

DESCRIPTION OF EMBODIMENTS

To make the objectives, technical solutions, and advantages of the embodiments of the present application clearer, the following will clearly describes the technical solutions in the embodiments of the present application with reference to the accompanying drawings in the embodiments of the present application the described embodiments are some rather than all of the embodiments of the present application. Based on the embodiments of the present application, all other embodiments obtained by those of ordinary skill in the art without making creative efforts fall within the scope of protection of the present application.

Unless otherwise defined, all technical and scientific terms used in the present application have the same meanings as those commonly understood by those who belong to the technical field of the present application. In the present application, the terms used in the specification of the present application are merely for the purpose of describing specific embodiments, and are not intended to limit the present application. The terms "including" and "having" and any variations thereof in the specification and claims of the present application and the above accompanying drawings are intended to cover non-exclusive inclusion. The terms "first", "second", etc. in the specification and claims of the present application or the above accompanying drawings are used to distinguish different objects, but not to describe a specific order or primary and secondary relationship.

Reference to an "embodiment" in the present application means that a specific feature, structure or characteristic described in conjunction with an embodiment may be included in at least one embodiment of the present application. The appearance of this phrase in various places in the specification does not necessarily mean the same embodiment, nor is it an independent or alternative embodiment mutually exclusive with other embodiments.

In the description of the present application, it should be noted that, unless otherwise explicitly specified and defined, the terms "mounting", "connecting", "connection" and "attachment" should be understood in a broad sense, for example, they may be a fixed connection, a detachable connection, or an integrated connection; and may be a direct connection, or an indirect connection via an intermediate medium, or communication inside two elements. For those of ordinary skill in the art, the specific meanings of the above terms in the present application could be understood according to specific circumstances.

In the embodiments of the present application, the same reference numerals refer to same parts, and for the sake of brevity, detailed descriptions of the same parts are omitted in different embodiments. It should be understood that a thickness, a length, a width and other dimensions of various parts and an overall thickness, length, width and other dimensions of an integrated device shown in the accompanying drawings in the embodiments of the present application are merely exemplary, and should not constitute any limitation on the present application.

The term "a plurality of" in the present application means two or more.

In the present application, battery cells may include a lithium ion secondary battery, a lithium ion primary battery, a lithium-sulfur battery, a sodium lithium-ion battery, a sodium ion battery, a magnesium ion battery, etc., which is not limited by the embodiments of the present application. The battery cell may be cylindrical, flat, cuboid or in other shapes, which is not limited by the embodiments of the present application. Generally, the battery cells are divided into three types according to a packaging mode: cylindrical battery cells, square battery cells and pouch battery cells, which is not limited by the embodiments of the present application.

A battery mentioned in the embodiment of the present application refers to a single physical module which includes one or a plurality of battery cells and therefore provides a higher voltage and capacity. For example, the battery mentioned in the present application may include a battery module, a battery pack, etc. Generally, the battery includes a box body for packaging one or a plurality of battery cells. The box body may prevent other foreign matter from affecting charging or discharging of the battery cell.

The battery cell includes an electrode assembly and an electrolyte solution, where the electrode assembly consists of a positive electrode plate, a negative electrode plate and a separator film. The battery cell works mainly depending on movement of metal ions between the positive electrode plate and the negative electrode plate. The positive electrode plate includes a positive current collector and a positive active material layer, the positive active material layer coating a surface of the positive current collector. A lithium ion battery is taken as an example, the positive current collector may be made from aluminum, and a positive active material may be lithium cobalt oxide, lithium iron phosphate, ternary lithium, lithium manganate, etc. The negative electrode plate includes a negative current collector and a negative active material layer, the negative active material layer coating a surface of the negative current collector. The negative current collector may be made from copper, and a negative active material may be carbon, silicon, etc. In order to guarantee that fusing does not occur during large current flow, there are a plurality of positive tabs, the plurality of positive tabs are stacked together, there are a plurality of negative tabs, and the plurality of negative tabs are stacked together. The separator film may be made from PP (polypropylene), PE (polyethylene), etc. In addition, in the present application, the electrode assembly is of a winding type structure.

For development of a battery technology, various design factors should be considered at the same time, such as energy density, cycle life, discharge capacity, charge-discharge rates and other performance parameters. In addition, safety of the battery needs to be further considered. Lithium plating is one of the main factors affecting electrical performance and safety performance of the battery. Once the lithium plating occurs, it may reduce the electrical performance of the battery, and may be likely to form dendrites with accumulation of the lithium plating, which may puncture the separator film and cause short circuit in the battery, resulting in potential safety hazards. There are many reasons for the lithium plating.

The applicant finds that there is a problem of the lithium plating at a winding start end and a winding tail end of the electrode assembly. After analysis, it is found that the reason that a size of a part, exceeding the positive active material layer of the positive electrode plate in a winding axial direction, of the negative active material layer of the negative electrode plate does not meet a design requirement is one of the main reasons for the lithium plating. Further studies indicate that several reasons why the size of the part, exceeding the positive active material layer of the positive electrode plate in the winding axial direction, of the negative active material layer of the negative electrode plate does not meet the design requirement are as follows:

As for a head of the electrode assembly (the winding start end of the electrode assembly), due to an inaccurate feeding position, feeding and drawing out a wound winding type electrode assembly from a winding needle, a structural error of a winding device, or no binding of a head of the positive electrode plate and a head of the negative electrode plate, it is likely to cause relative deviation between the head of the positive electrode plate and the head of the negative electrode plate, resulting in that a size of a part, exceeding the positive electrode plate in the winding axial direction, of the negative electrode plate does not meet the design requirement.

As for a tail of the electrode assembly (the winding tail end of the electrode assembly), the negative electrode plate may be cut off when winding is about to finish, so there is no tension at the tail of the cut negative electrode plate, and a tail of the negative electrode plate is likely to deviate from a tail of the positive electrode plate when the winding is finished. In addition, after the winding is completed, the electrode assembly needs to transfer hot pressing, which is likely to cause relative deviation between the tail of the positive electrode plate and the tail of the negative electrode plate in a transfer process, thus causing the size of the part, exceeding the positive electrode plate in the winding axial direction, of the negative electrode plate to be incapable of meeting the design requirement.

In view of this, the embodiments of the present application provide a technical solution, and a maximum width difference between a negative active material layer of the negative electrode plate at the head or tail and a positive active material layer of the positive electrode plate is larger than a maximum width difference between a negative active material layer of a middle section and the positive active material layer of the positive electrode plate, so that the risk of the lithium plating caused by the reason that the size of the part, exceeding the positive active material layer of the positive electrode plate in the winding axial direction, of the negative active material layer of the negative electrode plate does not meet the design requirement is reduced.

The technical solution described in the embodiment of the present application is applicable to a battery and a power consumption device using the battery.

The power consumption device may be a vehicle, a mobile phone, a portable apparatus, a notebook computer, a ship, a spacecraft, an electric toy, an electric tool, etc. The vehicles may be a fuel vehicle, a gas vehicle or a new energy vehicle, and the new energy vehicle may be a pure electric vehicle, a hybrid electric vehicle, an extended-range vehicle, etc. The spacecraft includes an aircraft, a rocket, a space shuttle, a spaceship, etc. The electric toy includes fixed or mobile electric toys, such as a game machine, an electric car toy, an electric boat toy and an electric airplane toy. The electric tool includes a metal cutting electric tool, a grinding electric tool, an assembling electric tool and a railway electric tool, such as an electric drill, an electric grinder, an electric wrench, an electric screwdriver, an electric hammer, an impact electric drill, a concrete vibrator and an electric planer. The embodiment of the present application does not make special restrictions on the above power consumption device.

In the following embodiments, a vehicle 1000 is taken as an example of the power consumption device for the convenience of description.

With reference to FIG. 1, FIG. 1 is a structural schematic diagram of the vehicle 1000 provided by some embodiments of the present application. A battery 100 is arranged inside the vehicle 1000, and the battery 100 may be arranged at a bottom, a head or a tail of the vehicle 1000. The battery 100 may be configured to supply power to the vehicle 1000, for example, the battery 100 may be configured to an operating power source of the vehicle 1000. The vehicle 1000 may further include a controller 200 and a motor 300, where the controller 200 is configured to control the battery 100 to supply power to the motor 300, for example, for working power requirements during starting, navigating and driving the vehicle 1000.

In some embodiments of the present application, the battery 100 may not only be used as an operating power source for the vehicle 1000, but serve as a driving power source for the vehicle 1000, replacing or partially replacing fuel or natural gas to provide driving power for the vehicle 1000.

Figure 2:
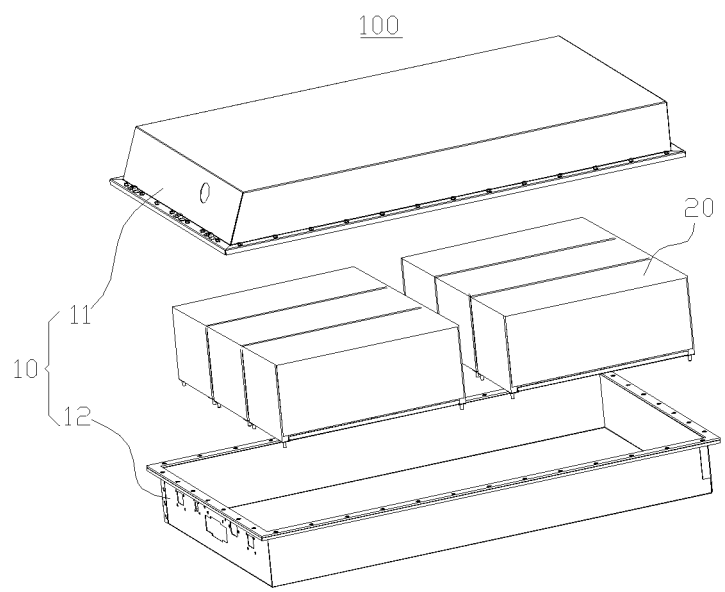
FIG. 2 is an exploded view of a battery provided by some embodiments of the present application.

As shown in FIG. 2, the battery 100 includes a box body 10 and a battery cell 20, where the battery cell 20 is accommodated in the box body 10, the box body 10 provides an accommodating space for the battery cell 20, the box body 10 includes a first box body portion 11 and a second box body portion 12, and the first box body portion 11 and the second box body portion 12 are configured to jointly define the accommodating space for accommodating the battery cell 20. In the battery 100, there may be one or more battery cells 20. If there are a plurality of battery cells 20, the plurality of battery cells 20 may be connected to one another in series, in parallel or in hybrid, the hybrid connection means that the plurality of battery cells 20 are connected in both series and parallel. The plurality of battery cells 20 may be directly connected in series, in parallel or in hybrid, and then a whole formed by the plurality of battery cells 20 can be accommodated in the box body 10. Of course, the plurality of battery cells 20 may be connected in series, in parallel or in hybrid to form a battery module firstly, and then a plurality of battery modules are connected in series, in parallel or in hybrid to form a whole to be accommodated in the box body 10. The battery cell 20 may be cylindrical, flat, or in other shapes.

In some embodiments, the battery 100 may further include a bus component (not shown in the figure), and a plurality of battery cells 20 may be electrically connected to one another by means of the bus component, so as to realize series connection, parallel connection or parallel-series connection of the plurality of the battery cells 20.

Figure 3:
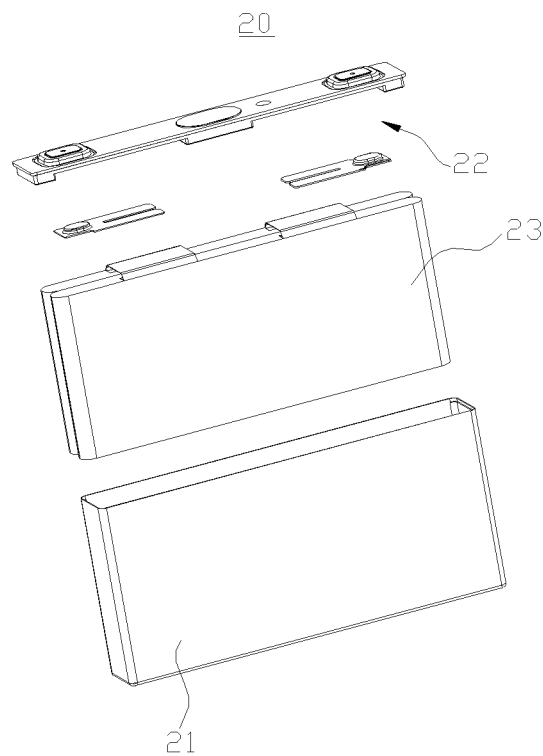
FIG. 3 is an exploded view of a battery cell provided by some embodiments of the present application.

With reference to FIG. 3, FIG. 3 shows an exploded view of the battery cell 20 provided by some embodiments of the present application. The battery cell 20 includes a housing 21, an end cover assembly 22 and an electrode assembly 23, where the housing 21 is provided with an opening, the electrode assembly 23 is accommodated in the housing 21, and the end cover assembly 22 is used to cover the opening. The housing 21 may be in various shapes, such as a cylinder and a flat shape. A shape of the housing 21 may be determined according to a specific shape of the electrode assembly 23. For example, if the electrode assembly 23 is of a cylinder structure, the housing 21 may be selected to be of a cylinder structure. If the electrode assembly 23 is of a flat structure, the housing 21 may be selected to be of a cuboid structure. The housing 21 may be made from various materials, such as copper, iron, aluminum, stainless steel and aluminum alloy, which is not specifically limited in the embodiment of the present application.

There may be one or more electrode assemblies 23 of the battery cell 20. FIG. 3 shows the battery cell 20 with the rectangular housing 21 and the two flat electrode assemblies 23 as an example. In FIG. 3, the two electrode assemblies 23 are arranged side by side.

Figure 4:
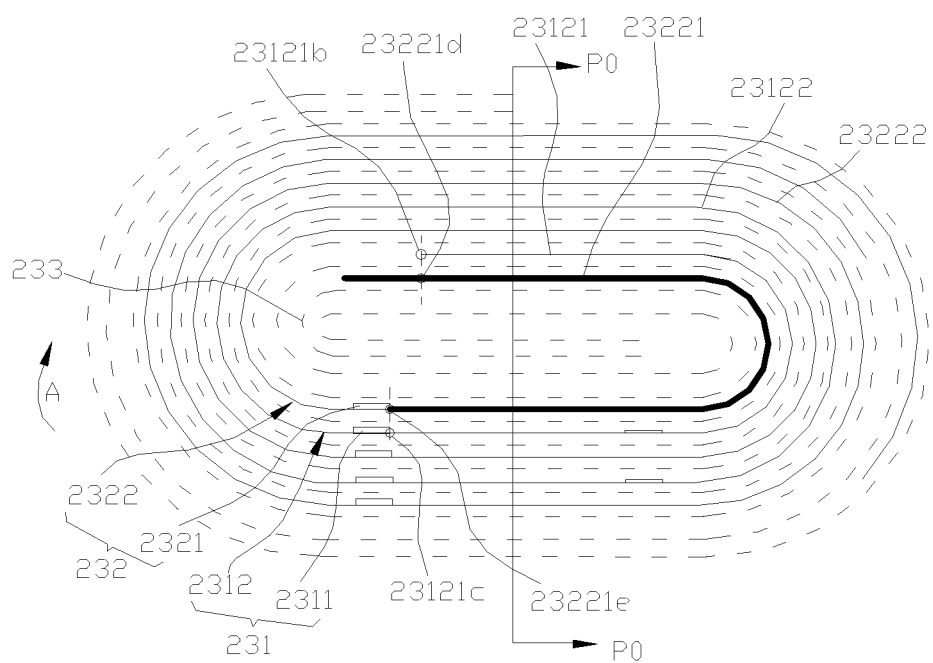
FIG. 4 is a structural schematic diagram of a winding type electrode assembly provided by some embodiments of the present application.
Figure 5:
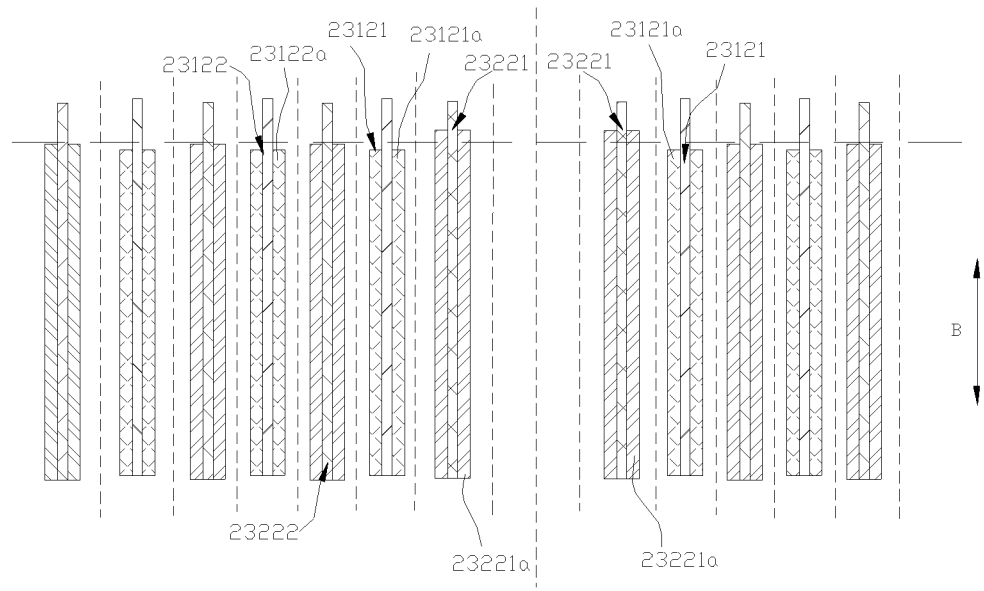
FIG. 5 is a cutaway view of a P0-P0 direction in FIG. 4.

With reference to FIGS. 4 and 5, FIG. 4 is a structural schematic diagram of a winding type electrode assembly 23 provided by some embodiments of the present application, and FIG. 5 is a cutaway view of a P0-P0 direction in FIG. 4. The electrode assembly 23 includes the positive electrode plate 231, the negative electrode plate 232 and the separator film 233, and the positive electrode plate 231, the negative electrode plate 232 and the separator film 233 are arranged in a stacking mode and wound in a winding direction A to form the electrode assembly 23. The separator film 233 is configured to separate the positive electrode plate 231 from the negative electrode plate 232, thus avoiding the short circuit in the battery 100 or the battery cell 20.

The positive electrode plate 231 includes the positive tab 2311 and a positive body 2312, the positive body 2312 of the positive tab 231 includes a first positive winding end portion 23121 and a positive winding middle section 23122 connected to each other, and the positive tab 2311 protrudes out of the positive body 2312 in the winding axial direction B; and the negative electrode plate 232 includes a negative body 2322 and the negative tab 2321, the negative body 2322 of the negative electrode plate 232 includes a first portion 23221 and a second portion 23222 connected to each other, and the negative tab 2321 protrudes out of the negative body 2322 in the winding axial direction B. In a thickness direction of the positive electrode plate 231, the positive tab 2311 may protrude out of the positive body 2312 and may not protrude out of the positive body 2312, for example, if the positive tab 2311 is welded to one end of the positive body 2312 in the winding axial direction B, the positive tab 2311 may protrude out of the positive body 2312 in the thickness direction; and if the positive tab 2311 is formed by die cutting the positive current collector, the positive tab 2311 may not protrude out of the positive body 2312. In a thickness direction of the negative electrode plate 232, the negative tab 2321 may protrude out of the negative body 2322 and may not protrude out of the negative body 2322, for example, if the negative tab 2321 is welded to one end of the negative body 2322 in the winding axial direction B, the negative tab 2321 may protrude out of the negative body 2322 in the thickness direction; and if the negative tab 2321 is formed by die cutting the negative current collector, the negative tab 2321 may not protrude out of the negative body 2322. When the electrode assembly is in a winding state, the thickness direction of the positive electrode plate 231 is perpendicular to the winding axial direction B of the electrode assembly 23, and the thickness direction of the negative electrode plate 232 is perpendicular to the winding axial direction B of the electrode assembly 23.

The first portion 23221 is arranged opposite to the first positive winding end portion 23121, and the second portion 23222 is arranged opposite to the positive winding middle section 23122; and in the winding axial direction B of the winding type electrode assembly 23, the negative active material layer of the negative electrode plate 232 exceeds the positive active material layer of the positive electrode plate 231, a maximum width of a negative active material layer 23221a of the first portion is H1, a minimum width of a positive active material layer 23121a of the first positive winding end portion is L1, a maximum width of a negative active material layer 23222a of the second portion is H2, a minimum width of a positive active material layer 23122a of the positive winding middle section is L2, and H1−L1>H2−L2.

A width difference between the maximum width of the negative active material layer 23221a of the first portion and the minimum width of the positive active material layer 23121a of the first positive winding end portion is set to be larger than a width difference between the maximum width of the negative active material layer 23222a of the second portion and the minimum width of the positive active material layer 23122a of the positive winding middle section, that is, a maximum width difference between the positive active material layer 23121a of the first positive winding end portion and the negative active material layer 23221a of the first portion is larger than a maximum width difference between the negative active material layer 23222a of the second portion and the positive active material layer 23122a of the positive winding middle section, so that the risk of the lithium plating caused by the reason that the size of the part, exceeding the positive active material layer of the positive electrode plate 231 in the winding axial direction B, of the negative active material layer of the negative electrode plate 232 does not meet the design requirement is reduced.

It should be noted that a width of a positive active material of the positive electrode plate 231 and a width of a negative active material of the negative electrode plate 232 both refers to sizes of the winding type electrode assembly 23 in the winding axial direction B. The maximum width of the negative active material layer 23221a of the first portion refers to a maximum size of the negative active material layer 23221a of the first portion in the winding axial direction B; the minimum width of the positive active material layer 23121a of the first positive winding end portion refers to a minimum size of the positive active material layer 23121a of the first positive winding end portion in the winding axial direction B; the maximum width of the negative active material layer 23222a of the second portion refers to a maximum size of the negative active material layer 23222a of the second portion in the winding axial direction B; and the minimum width of the positive active material layer 23122a of the positive winding middle section refers to a minimum size of the positive active material layer 23122a of the positive winding middle section in the winding axial direction B.

The maximum width difference refers to a difference between the maximum width and the minimum width, and the maximum width difference between the positive active material layer 23121a of the first positive winding end portion and the negative active material layer 23221a of the first portion refers to H1-L1; and the maximum width difference between the negative active material layer 23222a of the second portion and the positive active material layer 23122a of the positive winding middle section refers to H2-L2.

In some embodiments, with reference to FIGS. 4 and 5, the first positive winding end portion 23121 is a positive winding starting section, the first positive winding end portion 23121 is the positive body 2312 wound for a certain distance from a start end 23121b of the positive winding starting section in the winding direction A of the winding type electrode assembly 23, and the positive winding middle section 23122 is the positive body 2312 connected to the tail end of the first positive winding end portion 23121 (a tail end 23121c of the positive winding starting section) and wound in the winding direction A of the winding type electrode assembly 23 for a certain distance.

A part with a large line width shown in the present application is a part with an increased width of the negative active material layer of the negative electrode plate 232, which does not mean that a thickness of the part with the large line width of the negative electrode plate 232 is larger than that of a part with a small line width of the negative electrode plate 232, and when the electrode assembly is in the winding state, the thickness direction of the negative electrode plate 232 is perpendicular to the winding axial direction B of the electrode assembly 23.

The first portion 23221 is arranged opposite to the first positive winding end portion 23121, that is, the first portion 23221 is arranged opposite to the positive winding starting section, which is further described as that a start end 23221d of the first portion corresponds to the start end 23121b of the positive winding starting section, and a tail end 23221e of the first portion corresponds to the tail end 23121c of the positive winding starting section.

When the first positive winding end portion 23121 is the positive winding starting section, a positive active material layer of the positive winding starting section and the negative active material layer 23221a of the first portion meet a condition that H1−L1>H2−L2, so that a possibility that due to the inaccurate feeding position, feeding and drawing out the wound winding type electrode assembly from the winding needle, the structural error of the winding device, or no binding of the positive winding starting section and the first portion 23221, thus causing relative deviation between the positive winding starting section and the first portion 23221, resulting in that the size of the part, exceeding the positive electrode plate 231 in the winding axial direction B, of the negative electrode plate 232 does not meet the design requirement may be reduced.

Figure 6:
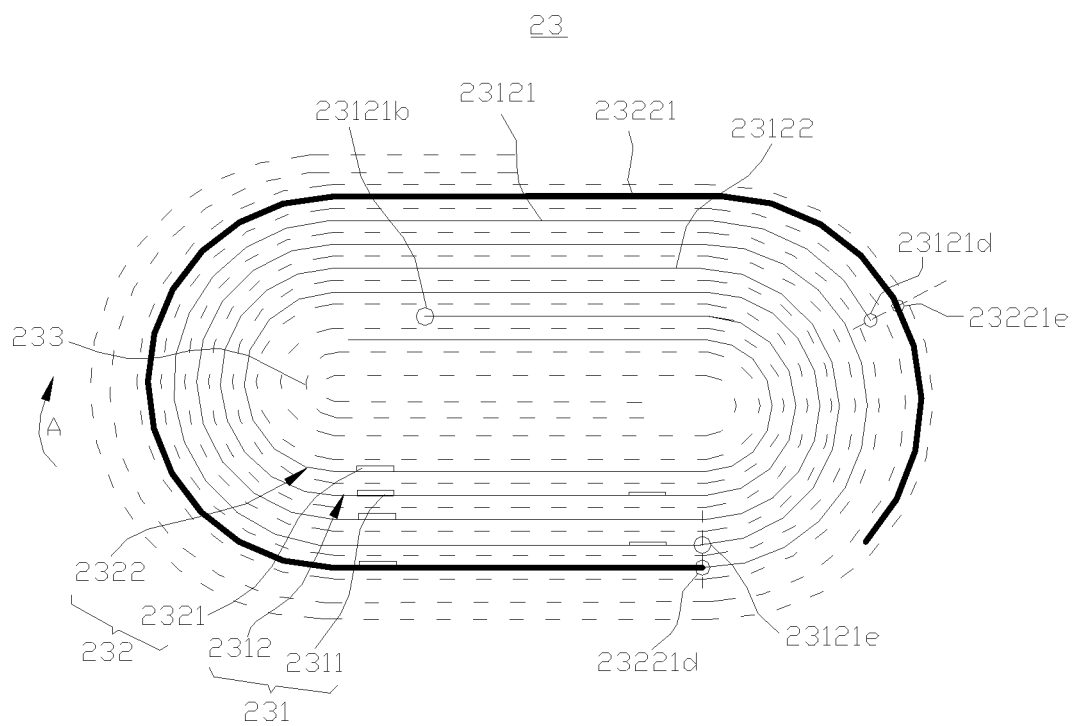
FIG. 6 is a structural schematic diagram of an electrode assembly, with a first positive winding end portion as a positive winding ending section, provided by some embodiments of the present application.

In some embodiments, as shown in FIG. 6, the first positive winding end portion 23121 is a positive winding ending section, the first positive winding end portion 23121 is the positive body 2312 wound for a certain distance from a tail end 23121d of the positive winding ending section in a direction opposite to the winding direction A of the winding type electrode assembly 23, and the positive winding middle section 23122 is the positive body 2312 connected to a start end of the first positive winding end portion 23121 (a start end 23121e of the positive winding ending section) and wound in the direction opposite to the winding direction A of the winding type electrode assembly 23 for a certain distance.

The first portion 23221 is arranged opposite to the first positive winding end portion 23121, that is, the first portion 23221 is arranged opposite to the positive winding ending section, which is further described as that a tail end 23221e of the first portion corresponds to the tail end 23121d of the positive winding ending section, and the start end 23221d of the first portion corresponds to the start end 23121e of the positive winding ending section. A positive active material layer of the positive winding ending section and the negative active material layer 23221a of the first portion meet the condition that H1−L1>H2−L2, so that a possibility that when the winding is about to finish, there is no tension at the first portion 23221 after the negative electrode plate 232 is cut, and after the winding is completed, the electrode assembly 23 needs to transfer hot pressing, which is likely to cause relative deviation between the first portion 23221 and the positive winding ending section in the transfer process, thus causing the size of the part, exceeding the positive electrode plate 231 in the winding axial direction B, of the negative electrode plate 232 to be incapable of meeting the design requirement may be reduced.

Figure 7:
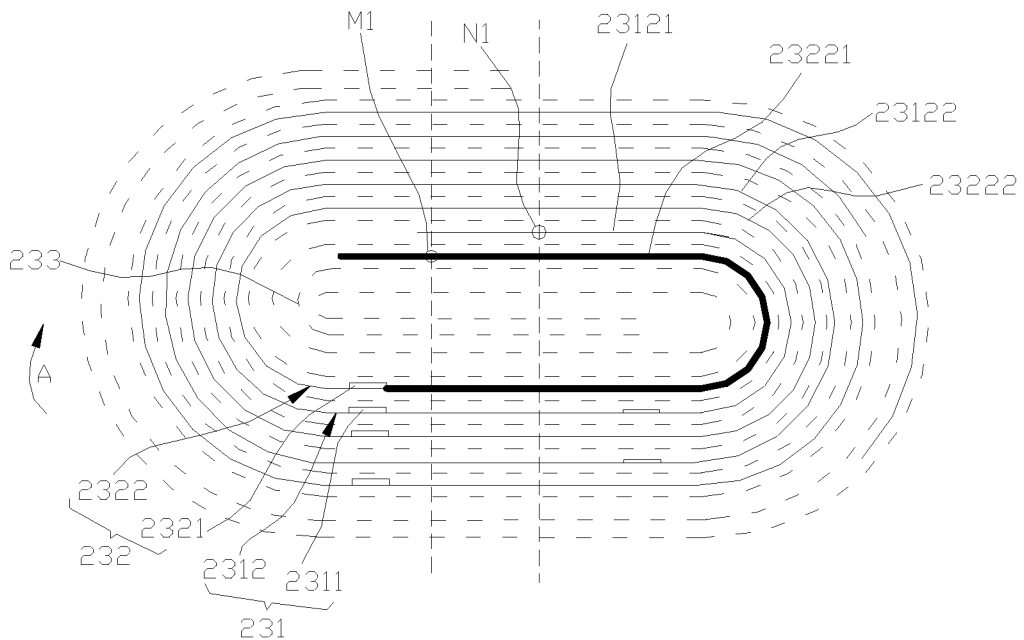
FIG. 7 is a structural schematic diagram of the electrode assembly, where a maximum width position of a negative active material layer of a first portion and a minimum width position of a positive active material layer of the first positive winding end portion are staggered, provided by some embodiments of the present application.

In the winding direction A, each position on the positive active material layer 23121a of the first positive winding end portion has a corresponding position of the negative active material layer 23221a of the first portion. In some embodiments, a maximum width position of the negative active material layer 23221a of the first portion and a minimum width position of the positive active material layer 23121a of the first positive winding end portion are staggered. For example, in FIG. 7, M1 is the maximum width position of the negative active material layer 23221a of the first portion, N1 is the minimum width position of the positive active material layer 23121a of the first positive winding end portion, and M1 and N1 are staggered in the winding direction A. In FIG. 7, a dotted line except a dotted line representing the separator film 233 is only used to clarify a relative positional relation between M1 and N1.

Figure 8:
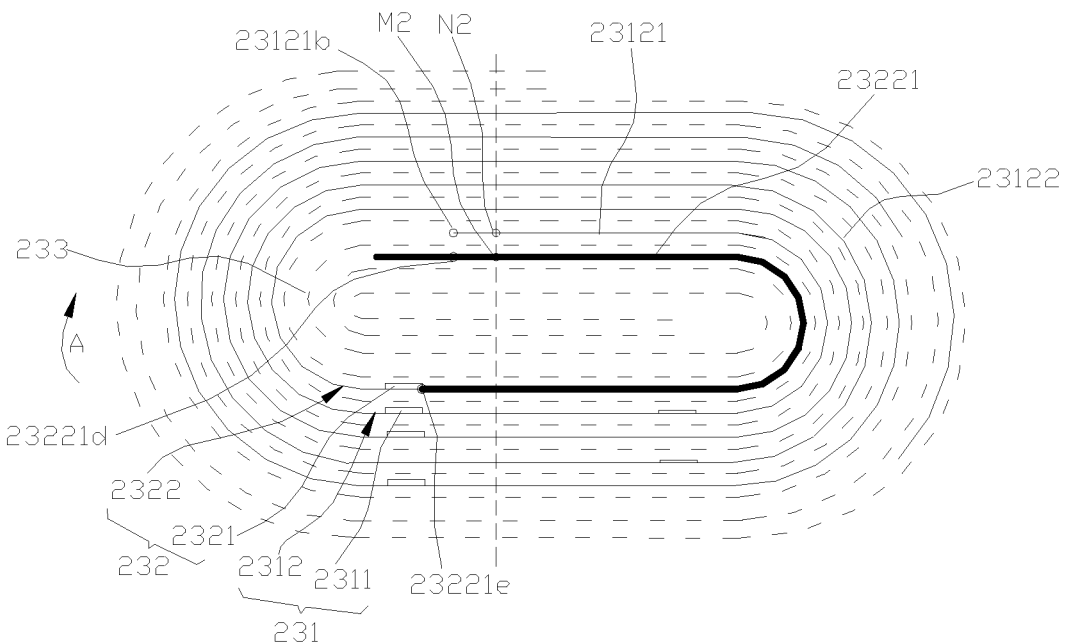
FIG. 8 is a structural schematic diagram of the electrode assembly, where the maximum width position of the negative active material layer of the first portion and the minimum width position of the positive active material layer of the first positive winding end portion correspond to each other, provided by some embodiments of the present application.

In some embodiments, the maximum width position of the negative active material layer 23221a of the first portion corresponds to a minimum width position of the first positive winding end portion 23121. For example, in FIG. 8, M2 is the maximum width position of the negative active material layer 23221a of the first portion, N2 is the minimum width position of the positive active material layer 23121a of the first positive winding end portion, and M2 corresponds to N2. In FIG. 8, a dotted line except the dotted line representing the separator film 233 is only used to clarify a relative positional relation between M2 and N2.

In order to realize the purpose that the maximum width difference between the positive active material layer 23121a of the first positive winding end portion and the negative active material layer 23221a of the first portion is larger than the maximum width difference between the negative active material layer 23222a of the second portion and the positive active material layer 23122a of the positive winding middle section, improvement may be made to the negative electrode plate 232 or the positive electrode plate 231 or the positive electrode plate 231 and the negative electrode plate 232.

In some embodiments, a structure of the negative electrode plate 232 is improved so as to enable the maximum width difference between the positive active material layer 23121a of the first positive winding end portion and the negative active material layer 23221a of the first portion to be larger than the maximum width difference between the negative active material layer 23222a of the second portion and the positive active material layer 23122a of the positive winding middle section.

Figure 9:
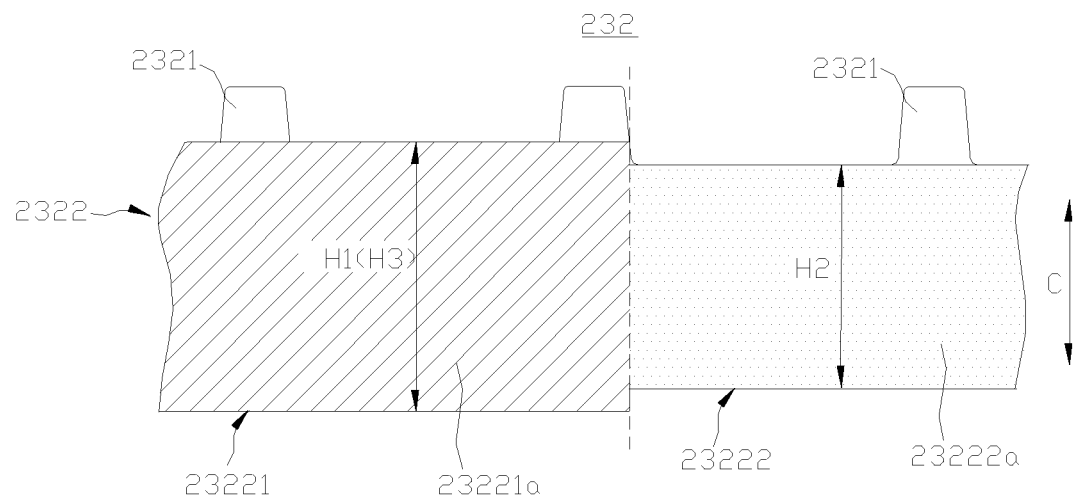
FIG. 9 is a structural schematic diagram of a negative electrode plate provided by some embodiments of the present application.

In some embodiments, with reference to FIG. 9, FIG. 9 is a structural schematic diagram of the negative electrode plate 232 provided by some embodiments of the present application. In the winding axial direction B (consistent with a shown width direction C), the negative active material layer 23221a of the first portion and the negative active material layer 23222a of the second portion have a width difference, that is, H1>H2, which means that a width of the negative active material layer 23221a of the first portion is increased compared with the negative active material layer 23222a of the second portion, so that on the premise of guaranteeing the energy density, the risk of the lithium plating caused by the reason that the size of the part, exceeding the positive active material layer of the positive electrode plate 231 in the winding axial direction B, of the negative active material layer of the negative electrode plate 232 does not meet the design requirement may be reduced.

In some embodiments, a minimum width of the negative active material layer 23221a of the first portion is H3, where H3≥H2. The maximum width of the negative active material layer 23221a of the first portion is larger than the maximum width of the negative active material layer 23222a of the second portion, and the minimum width of the negative active material layer 23221a of the first portion is not less than the maximum width of the negative active material layer 23222a of the second portion, so that a possibility of the lithium plating caused by the reason that a size of a part, exceeding the positive active material layer 23121a of the first positive winding end portion in the winding axial direction B, of the negative active material layer 23221a of the first portion does not meet the design requirement due to relative deviation between the first positive winding end portion 23121 and the first portion 23221 may be reduced.

When a width of the first portion 23221 is too large, it is possible that the width exceeds a width of the separator film 233 and the first portion further interferes with an end cover assembly 22 (as shown in FIG. 3), increasing the short circuit risk; and if the width of the first portion 23221 is two small, the first portion is likely affected by a tolerance of a winding device and cannot cover the first positive winding end portion 23121. In some embodiments, 0.3 mm≤H1−H2≤3 mm may guarantee use safety of the winding type electrode assembly 23, may enable the first portion 23221 of the negative electrode plate 232 to cover the first positive winding end portion 23121, and reduces the possibility that the size of the part, exceeding the positive active material layer of the positive electrode plate 231 in the winding axial direction B, of the negative active material layer of the negative electrode plate 232 does not meet the design requirement. In some embodiments, 0.3 mm≤H1−H2≤1.5 mm.

In some embodiments, with further reference to FIG. 9, the negative active material layer 23221a of the first portion is of an equal-width structure, that is, the negative active material layer 23221a of the first portion is consistent in width, and H1=H3.

In some embodiments, as shown in FIG. 9, in the winding axial direction B (consistent with the shown width direction C), two ends of the negative active material layer 23221a of the first portion exceed two ends of the negative active material layer 23222a of the second portion correspondingly. A dotted line in FIG. 9 is only used to distinguish the first portion 23221 from the second portion 23222, and does not affect the structure of the negative electrode plate 232.

Figure 10:
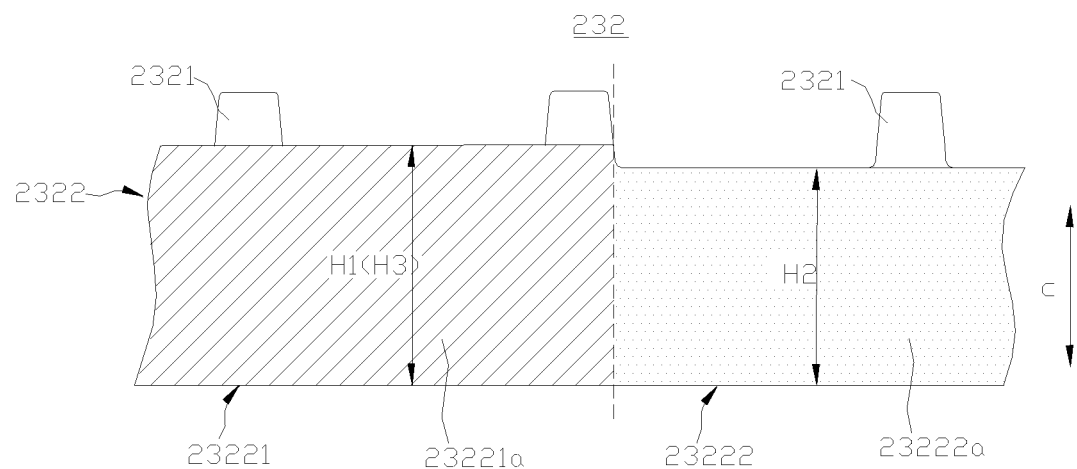
FIG. 10 is a structural schematic diagram of the negative electrode plate, where one end of a first portion exceeds a second portion, provided by some embodiments of the present application.

In some embodiments, as shown in FIG. 10, in the winding axial direction B (consistent with the shown width direction C), one end of the negative active material layer 23221a of the first portion exceeds a corresponding end of the negative active material layer 23222a of the second portion, and the other end of the negative active material layer 23221a of the first portion is flush with the other end of the negative active material layer 23222a of the second portion. A dotted line in FIG. 10 is only used to distinguish the first portion 23221 from the second portion 23222, and does not affect the structure of the negative electrode plate 232.

The fact that the end of the negative active material layer 23221a of the first portion exceeds the corresponding end of the negative active material layer 23222a of the second portion means that in the winding axial direction, the end of the negative active material layer 23221a of the first portion exceeds one end of the negative active material layer 23222a of the second portion closest to the negative active material layer 23221a of the first portion in the winding axial direction B.

In some embodiments, with further reference to FIG. 10, in the winding axial direction B (consistent with the shown width direction C), the negative tab 2321 is located at one end of the negative electrode plate 232, one end of the negative active material layer 23221a of the first portion close to the negative tab 2321 exceeds a corresponding end of the negative active material layer 23222a of the second portion, and the other end of the negative active material layer 23221a of the first portion is flush with the other end of the negative active material layer 23222a of the second portion, which means that the other end of the negative active material layer 23221a of the first portion and the other end of the negative active material layer 23222a of the second portion are coplanar. In the winding axial direction B, one end of the negative active material layer 23221a of the first portion close to the negative tab 2321 completely exceeds the corresponding end of the negative active material layer 23222a of the second portion, and the other end of the negative active material layer 23221a of the first portion is flush with the other end of the negative active material layer 23222a of the second portion.

Figure 11:
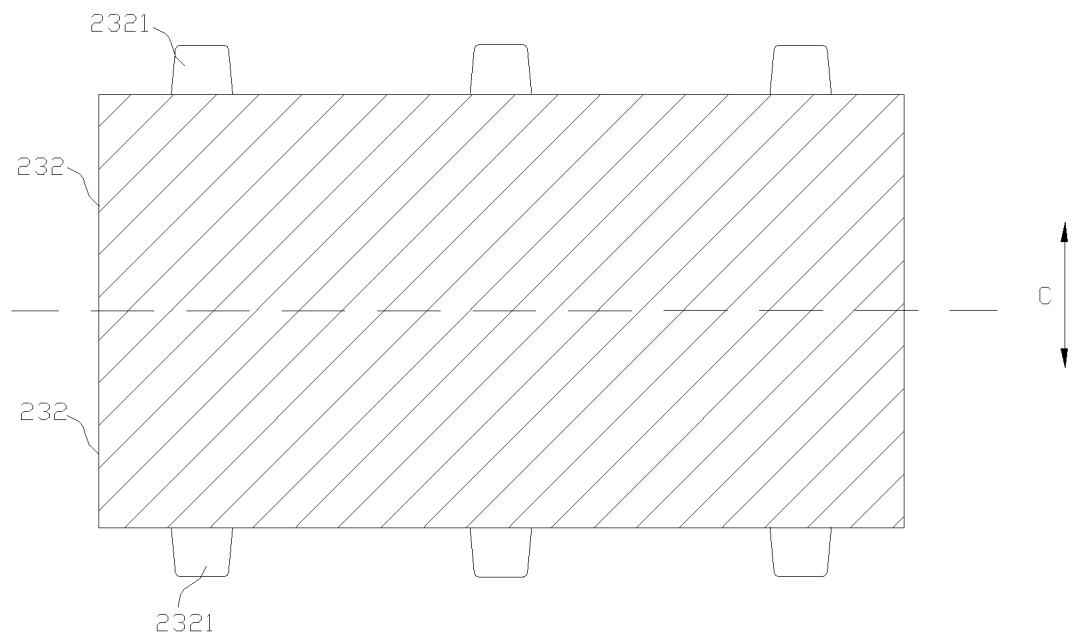
FIG. 11 is a schematic diagram of a negative electrode plate formed through die cutting in the prior art.

As shown in FIG. 11, the negative electrode plate 232 is generally formed by applying a negative active material layer consistent in width to the negative current collector and then forming the negative tab 2321 on two sides of the negative current collector in the width direction C through die cutting. The two negative electrode plates 232 with the negative tabs 2321 on single sides are formed on a middle position in the width direction C through cutting, that is, the two negative electrode plates 232 are formed in a dotted line direction in FIG. 11 through die cutting. One end of the negative active material layer 23221a of the first portion close to the negative tab 2321 exceeds the corresponding end of the negative active material layer 23222a of the second portion, so that in a process of forming the negative tab 2321 through the die cutting, the negative electrode plate 232 with a width difference between the negative active material layer 23221a of the first portion and the negative active material layer 23222a of the second portion may be formed, that is, the negative electrode plate with the width difference between the negative active material layer 23221a of the first portion and the negative active material layer 23222a of the second portion may be formed by using an original forming process of the negative electrode plate 232.

It should be noted that after the electrode assembly is formed through winding, the width direction C of the negative current collector is consistent with the winding axial direction B of the electrode assembly.

Figure 12:
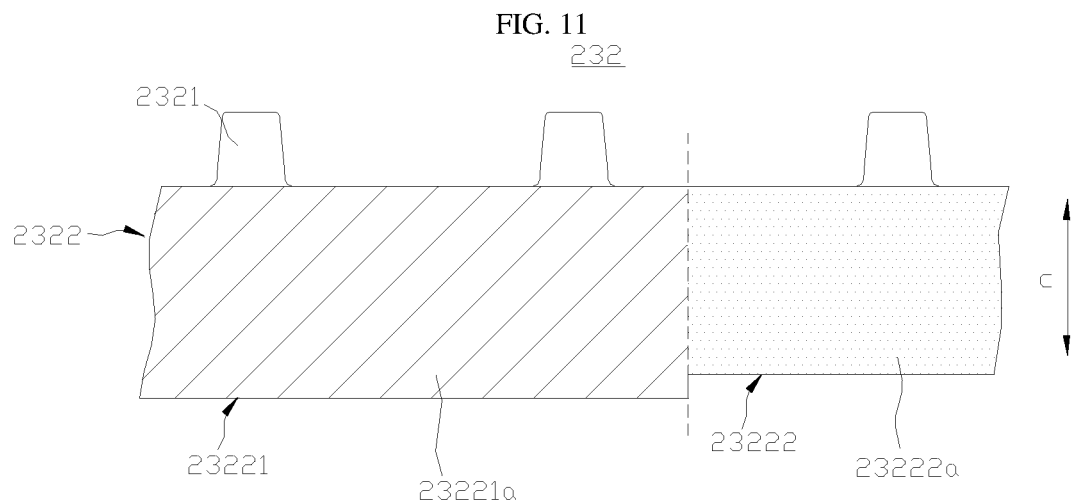
FIG. 12 is a structural schematic diagram of the negative electrode plate, where one end of the first portion exceeds the second portion, provided by some other embodiments of the present application.

In some embodiments, as shown in FIG. 12, in the winding axial direction B (consistent with the shown width direction C), it may also be one end of the negative active material layer 23221a of the first portion away from the negative tab 2321 that at least partially exceeds a corresponding end of the negative active material layer 23222a of the second portion, and the other end of the negative active material layer 23221a of the first portion is flush with the other end of the negative active material layer 23222a of the second portion. A dotted line in FIG. 12 is only used to distinguish the first portion 23221 from the second portion 23222, and does not affect the structure of the negative electrode plate 232.

In some embodiments, the negative active material layer 23221a of the first portion is of a variable-width structure, that is, the negative active material layer 23221a of the first portion is inconsistent in width. The negative active material layer 23221a of the first portion which is of the variable-width structure has various structural forms.

Figure 13:
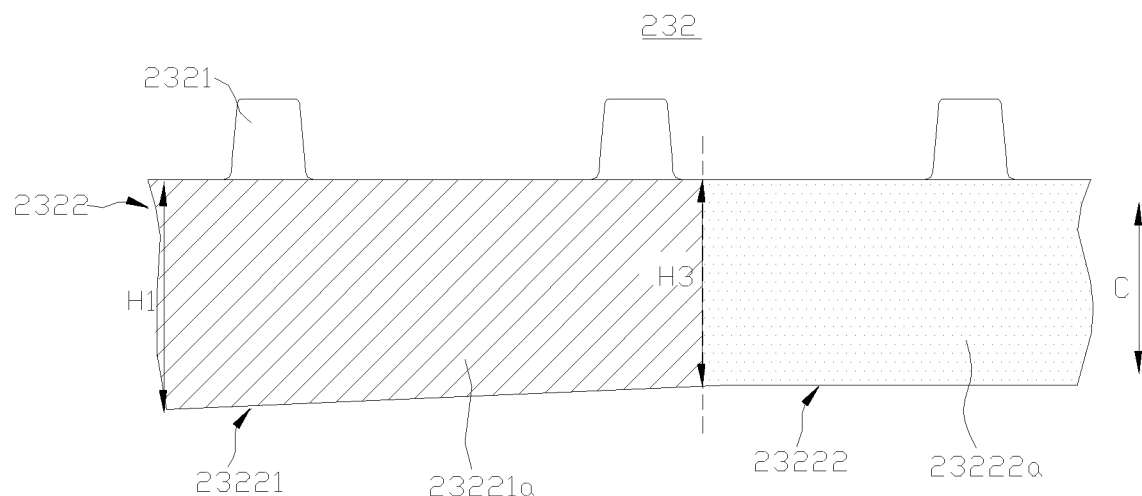
FIG. 13 is a structural schematic diagram of the negative electrode plate, where the first portion is inconsistent in width, provided by some embodiments of the present application.

With reference to FIG. 13, the width of the negative active material layer 23221a of the first portion gradually increases in a direction away from the second portion 23222, and a width of any position of the negative active material layer 23221a of the first portion is larger than the maximum width of the negative active material layer 23222a of the second portion. A dotted line in FIG. 13 is only used to distinguish the first portion 23221 from the second portion 23222, and does not affect the structure of the negative electrode plate 232.

Figure 14:
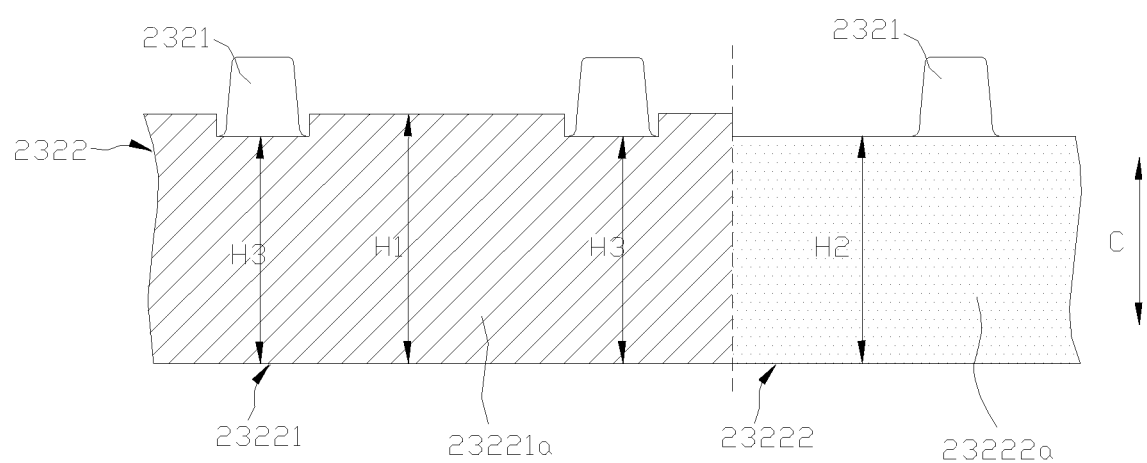
FIG. 14 is a structural schematic diagram of the negative electrode plate, where the first portion is inconsistent in width, provided by still some embodiments of the present application.

As shown in FIG. 14, a width of a part of the negative active material layer 23221a of the first portion is smaller than a width of the other part of the negative active material layer 23221a of the first portion, and in FIG. 14, widths of negative active material layers on two sides of the negative tab 2321 protruding out of the first portion 23221 are larger than a width of a negative active material layer at a connection position between the first portion 23221 and the negative tab 2321. When H3=H2, one end of the negative active material layer 23221a of the first portion close to the negative tab 2321 at least partially exceeds the negative active material layer 23222a of the second portion, and when H3>H2, one end of the negative active material layer 23221a of the first portion close to the negative tab 2321 completely exceeds the negative active material layer 23222a of the second portion. A dotted line in FIG. 14 is only used to distinguish the first portion 23221 from the second portion 23222, and does not affect the structure of the negative electrode plate 232.

As long as the maximum width of the negative active material layer 23221a of the first portion is larger than the maximum width of the negative active material layer 23222a of the second portion and the minimum width of the negative active material layer 23221a of the first portion is not less than the maximum width of the negative active material layer 23222a of the second portion, the possibility of the lithium plating may be reduced. In this way, in the winding axial direction B, a width of the negative current collector 23221b of the first portion and a width of the negative current collector 23222b of the second portion may be consistent or not.

Figure 15:
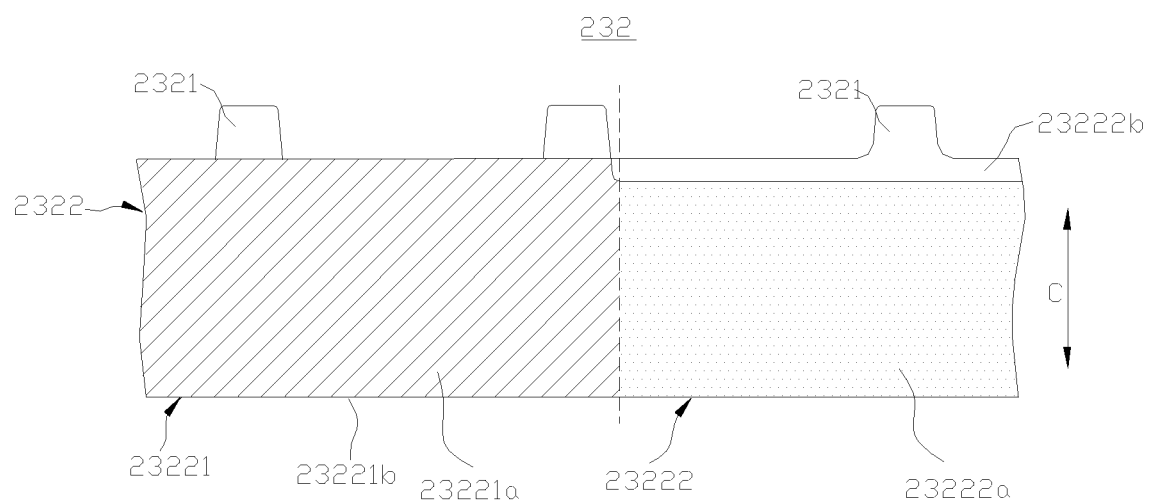
FIG. 15 is a schematic structural diagram of the negative electrode plate provided by still some embodiments of the present application.

In some embodiments, with further reference to FIG. 15, in the winding axial direction B (consistent with the shown width direction C), the negative current collector 23221b of the first portion and the negative current collector 23222b of the second portion are consistent in width, one end of the negative active material layer 23221a of the first portion close to the negative tab 2321 is flush with a corresponding end of the negative current collector 23221b of the first portion, and the other end of the negative active material layer 23221a of the first portion is flush with a corresponding end of the negative current collector 23221b of the first portion; one end of the negative current collector 23222b of the second portion close to the negative tab 2321 exceeds a corresponding end of the negative active material layer 23222a of the second portion, and the other end of the negative current collector 23222b of the second portion is flush with a corresponding end of the negative active material layer 23222a of the second portion; and one end of the negative active material layer 23221a of the first portion close to the negative tab 2321 exceeds a corresponding end of the negative active material layer 23222a of the second portion.

Figure 16:
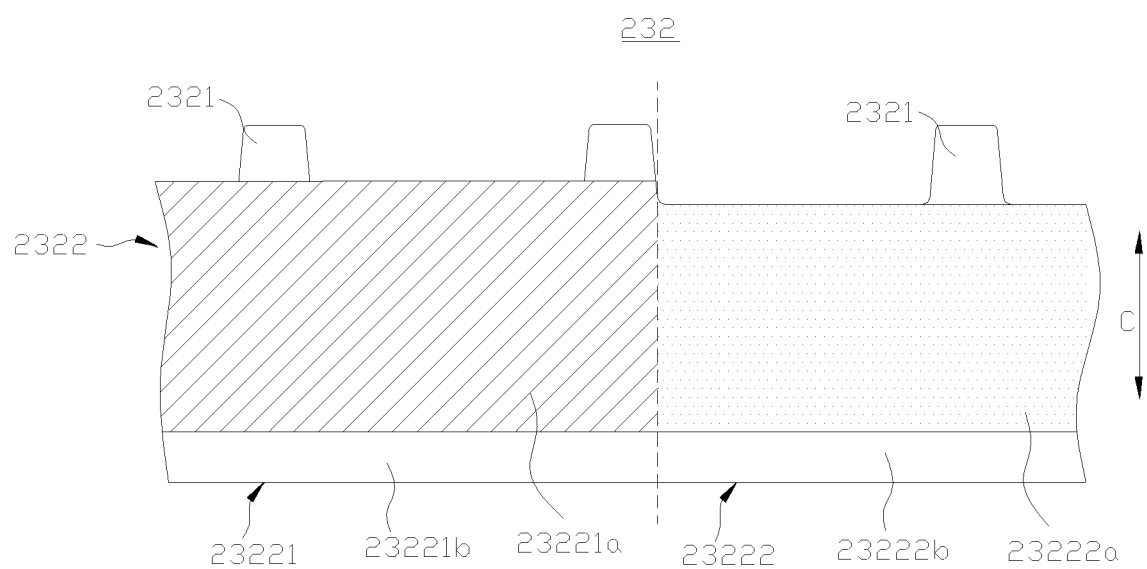
FIG. 16 is a structural schematic diagram of the negative electrode plate provided by some other embodiments of the present application.

In some embodiments, as shown in FIG. 16, in the winding axial direction B (consistent with the shown width direction C), one end of the negative current collector 23221b of the first portion away from the negative tab 2321 exceeds a corresponding end of the negative active material layer 23221a of the first portion, and the other end of the negative current collector 23221b of the first portion is flush with a corresponding end of the negative active material layer 23221a of the first portion; one end of the negative current collector 23222b away from the negative tab 2321 of the second portion exceeds a corresponding end of the negative active material layer 23222a of the second portion, and the other end of the negative current collector 23222b of the second portion is flush with the corresponding end of the negative active material layer 23222a of the second portion; and one end of the negative current collector 23221b of the first portion away from the negative tab 2321 is flush with one end of the negative current collector 23222b of the second portion away from the negative tab 2321; and one end of the negative active material layer 23221a of the first portion away from the negative tab 2321 is flush with a corresponding end of the negative active material layer 23222a of the second portion, and one end of the negative active material layer 23221a of the first portion close to the negative tab 2321 exceeds the corresponding end of the negative active material layer 23222a of the second portion.

Figure 17:
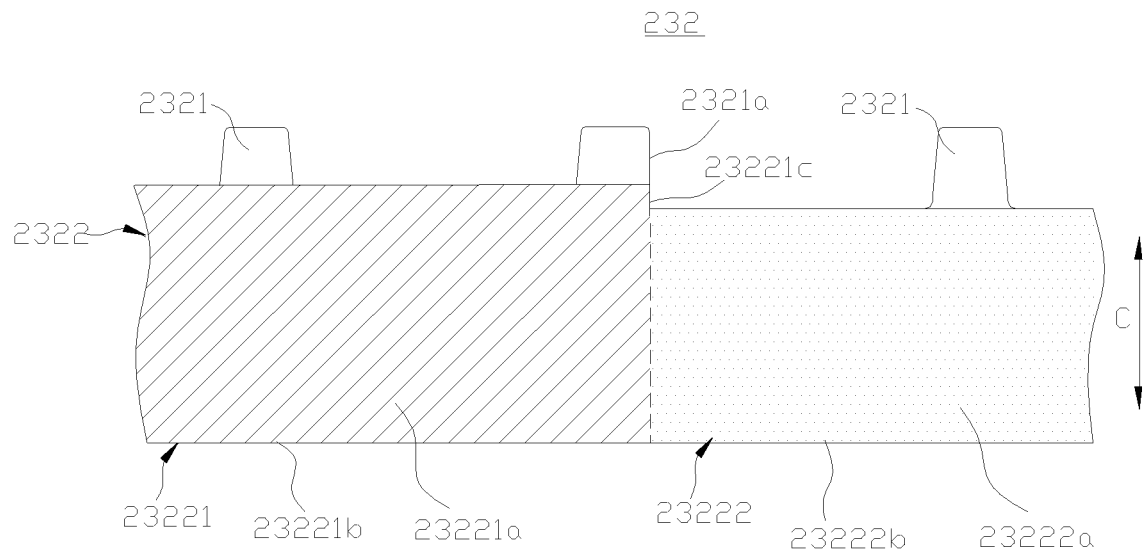
FIG. 17 is a structural schematic diagram of the negative electrode plate provided by some other embodiments of the present application.

In some embodiments, as shown in FIG. 17, in the winding axial direction B (consistent with the shown width direction C), one end of the first portion 23221 close to the negative tab 2321 exceeds a corresponding end of the second portion 23222, and the other end of the first portion 23221 is flush with the other end of the second portion 23222. It may be understood that one end of the negative current collector 23221b of the first portion close to the negative tab 2321 exceeds a corresponding end of the negative current collector 23222b of the second portion, and the other end of the negative current collector 23221b of the first portion is flush with the other end of the negative current collector 23222b of the second portion; one end of the negative active material layer 23221a of the first portion close to the negative tab 2321 exceeds the corresponding end of the negative active material layer 23222a of the second portion, and the other end of the negative active material layer 23221a of the first portion is flush with the other end of the negative active material layer 23222a of the second portion; one end of the negative current collector 23221b of the first portion close to the negative tab 2321 is flush with one end of the negative active material layer 23221a of the first portion close to the negative tab 2321, and the other end of the negative current collector 23221b of the first portion is flush with the other end of the negative active material layer 23221a of the first portion; and one end of the negative current collector 23222b of the second portion close to the negative tab 2321 is flush with one end of the negative active material layer 23222a of the second portion close to the negative tab 2321, and the other end of the negative current collector 23222b of the second portion is flush with the other end of the negative active material layer 23222a of the second portion. The negative electrode plate 232 not only facilitates coating of the negative active material layer, but also may form the negative electrode plate 232 with a width difference between the first portion 23221 and the second portion 23222 in the process of forming the negative tab 2321 through the die cutting, that is, the negative electrode plate with the width difference between the first portion 23221 and the second portion 23222 may be formed by using the original forming process of the negative electrode plate 232.

In some embodiments, with further reference to FIG. 17, in the winding direction A, the first portion 23221 is provided with a connection surface 23221c connected to the second portion 23222; and negative tabs 2321 are multiple in quantity, one negative tab 2321 of the multiple negative tabs 2321 protrudes out of the first portion 23221 in the winding axial direction B and is provided with a first side face 2321a close to the second portion 23222, and the first side face 2321a and the connection surface 23221c are coplanar. The connection surface 23221c connecting the first portion 23221 and the second portion 23222 is coplanar with one side face of the negative tab 2321, so that a situation that the connection surface 23221c warps due to no binding and then punctures the separator film 233 during and after winding may be avoided.

In some embodiments, with further reference to FIG. 17, in the winding axial direction B (consistent with the shown width direction C), an extending direction of the first side face 2321a is consistent with the winding axial direction B, and the connection surface 23221c is a flat face parallel to the first side face 2321a, that is, an extending direction of the connection surface 23221c is consistent with the winding axial direction B.

Figure 18:
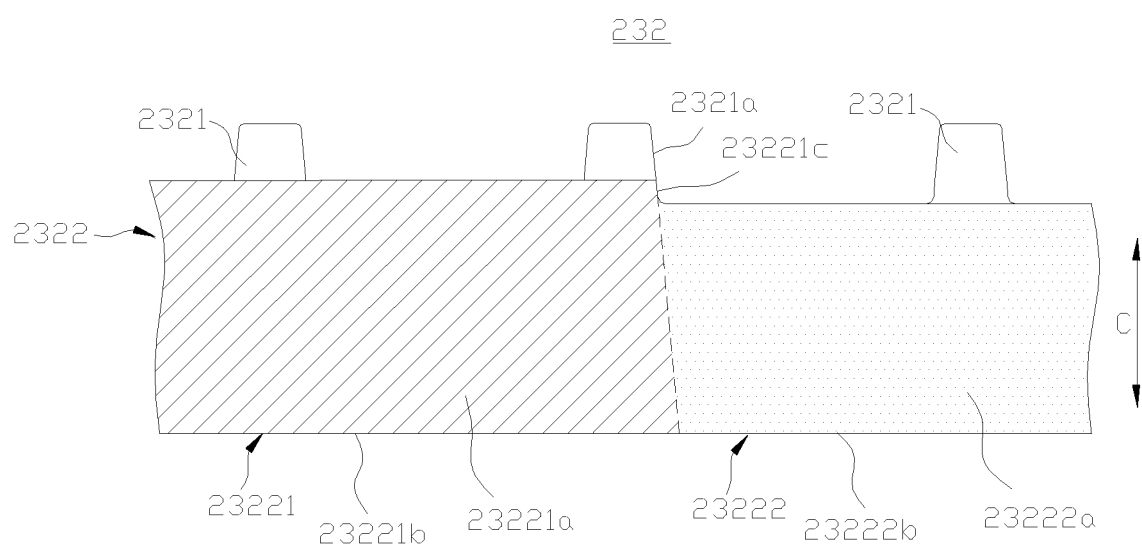
FIG. 18 is a structural schematic diagram of the negative electrode plate, a connection surface of which is oblique, provided by some embodiments of the present application.

In some embodiments, as shown in FIG. 18, the first side face 2321a is an inclined face which gradually inclines to the second portion 23222 from top to bottom in the figure, the connection surface 23221c is also an inclined face, and in the winding axial direction B, the connection surface 23221c gradually inclines to the second portion 23222 from one end close to the negative tab 2321.

Figure 19:
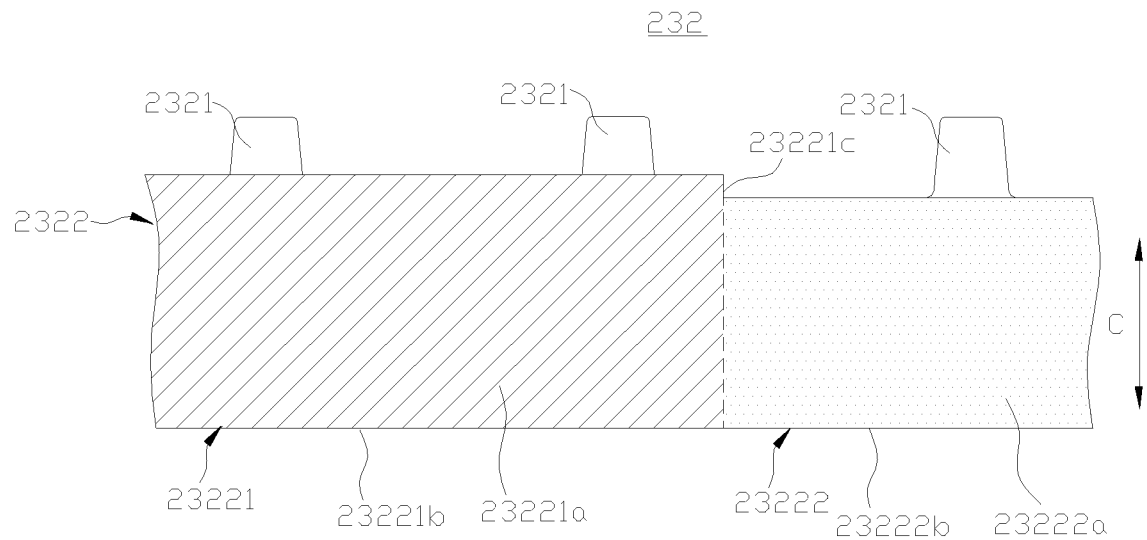
FIG. 19 is a schematic structural diagram of the negative electrode plate, a first side face and the connection surface of which are not coplanar, provided by some embodiments of the present application.

In some embodiments, as shown in FIG. 19, the connection surface 23221c may also be located between the two adjacent negative tabs 2321 and not coplanar with a side face of any negative tab 2321.

In some embodiments, there may be one negative tab 2321, and the first side face 2321a of the negative tab 2321 is coplanar or not coplanar with the connection surface 23221c.

Figure 20:
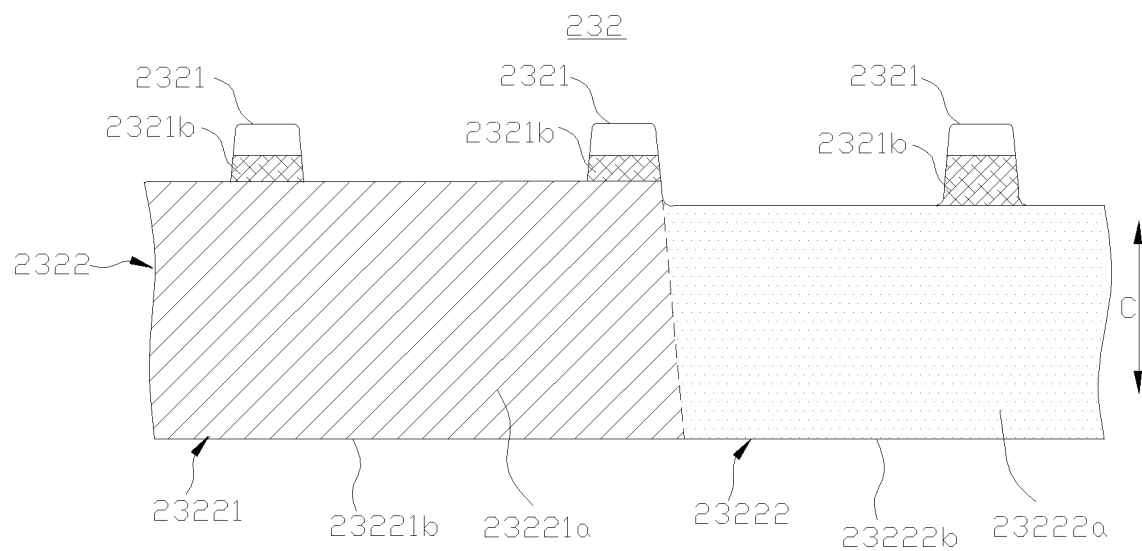
FIG. 20 is a structural schematic diagram of the negative electrode plate, where a negative active material layer of a negative tab and the negative active material layer of a negative body are connected, provided by some embodiments of the present application.

In some embodiments, as shown in FIG. 20, in the winding axial direction B (consistent with the shown width direction C), the negative tab 2321 protruding out of the first portion 23221 is provided with a negative active material layer, and the negative active material layer 2321b on the negative tab protruding out of the first portion 23221 is connected to the negative active material layer 23221a of the first portion. The negative active material layer on the negative tab 2321 may further cover the positive electrode plate 231, which means that a width of a negative active material layer of part of the first portion 23221 is further increased, so that the risk of the lithium plating caused by the reason that the size of the part, exceeding the positive active material layer of the positive electrode plate 231 in the winding axial direction B, of the negative active material layer of the negative electrode plate 232 does not meet the design requirement may be further reduced.

Figure 21:
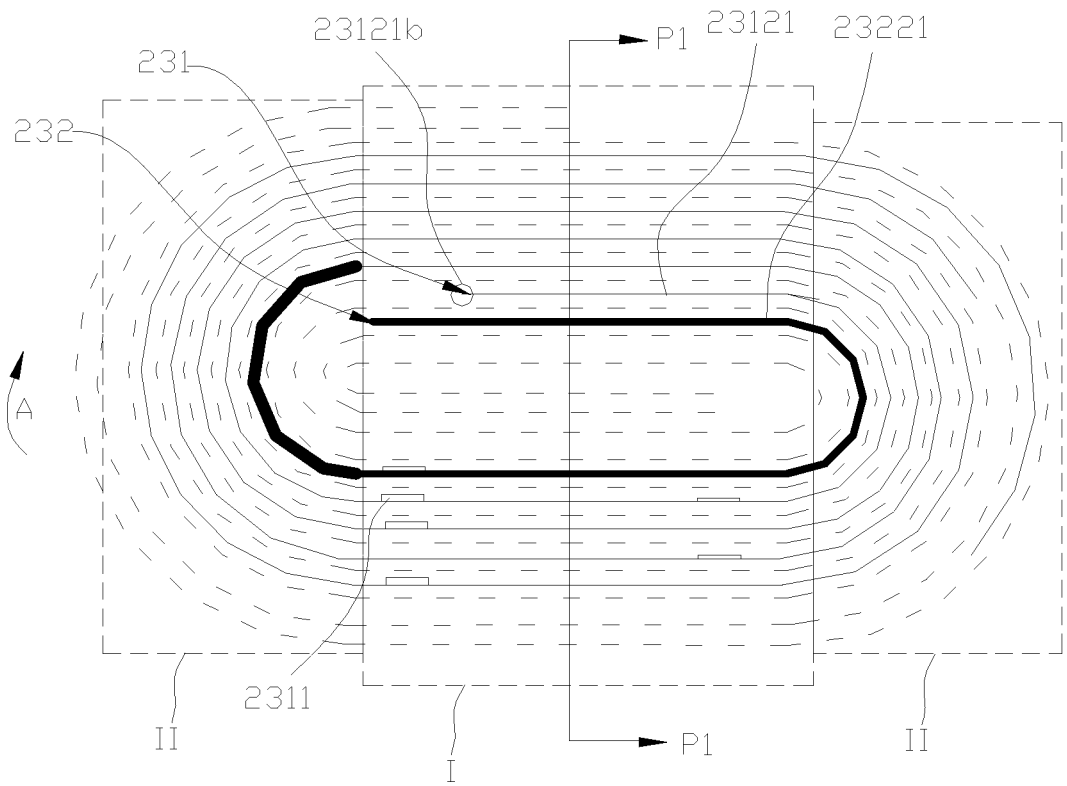
FIG. 21 is a structural schematic diagram of an electrode assembly provided by some embodiments of the present application.

In some embodiments, with reference to FIG. 21, the winding type electrode assembly 23 includes a straight area I and two bent areas II, and the two bent areas II are connected to two ends of the straight area I respectively. The first portion 23221 passes through the straight area I at least two times. In fact, after the first portion 23221 passes through the straight area I two times, a winding length is close to a length of a circle, when the next circle of winding is started, a certain binding effect is made on the start end 23121b of the positive winding starting section and a start end of the negative electrode plate 232, and a possibility of relative deviation between the first positive winding end portion 23121 and the first portion 23221 is small, so the first portion 23221 passes through the straight area I at least two times, which may reduce the possibility of the lithium plating caused by the reason that the size of the part, exceeding the negative active material layer 23221a of the first portion in the winding axial direction B, of the positive active material layer 23121a of the first positive winding end portion does not meet the design requirement due to relative deviation between the first positive winding end portion 23121 and the first portion 23221 as much as possible.

An inner side and an outer side of the positive current collector of the positive electrode plate 231 are both coated with positive active material layers, widths of the positive active material layers on the inner side and the outer side of the positive current collector of the positive electrode plate 231 may be consistent or not, an inner side and an outer side of the negative current collector of the negative electrode plate 232 are both coated with negative active material layers, and widths of the negative active material layers on the inner side and the outer side of the negative current collector of the negative electrode plate 232 may be consistent or not.

In some embodiments, comparison between the width of the negative active material layer 23221a of the first portion and a width of the positive active material layer 23121a of the first positive winding end portion may be made by comparing only a width of a negative active material layer of the first portion 23221 facing the first positive winding end portion 23121 and a width of a positive active material layer of the first positive winding end portion 23121 facing the first portion 23221, so that only the width of the negative active material layer of the first portion 23221 facing the first positive winding end portion 23121 may be increased so as to meet H1−L1>H2−L2.

It should be noted that the inner sides and the outer sides of the positive current collector of the positive electrode plate 231 and the negative current collector of the negative electrode plate 232 are defined with respect to a winding axis, one side of the positive current collector of the positive electrode plate 231 close to winding axis is the inner side of the positive current collector of the positive electrode plate 231, one side of the positive electrode plate 231 away from the winding axis is the outer side of the positive current collector of the positive electrode plate 231, one side of the negative current collector of the negative electrode plate 232 close to the winding axis is the inner side of the negative current collector of the negative electrode plate 232, and one side of the negative current collector of the negative electrode plate 232 away from the winding axis is the outer side of the negative current collector of the negative electrode plate 232.

Figure 22:
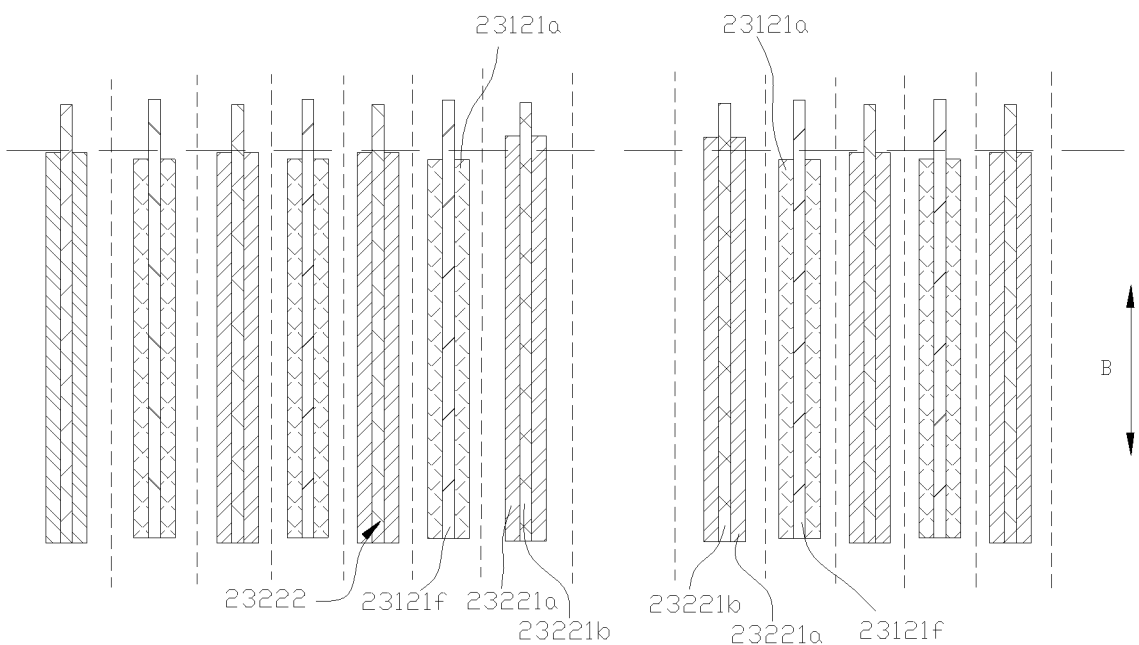
FIG. 22 is a cutaway view of a P1-P1 direction in FIG. 19.

In some embodiments, as shown in FIGS. 21 and 22, the first portion 23221 passes through the straight area I two times, the first positive winding end portion 23121 passes through the straight area I two times. The negative active material layers on the outer sides of the negative current collector 23221b of the first portion in the two straight areas I face a positive active material on an inner side of a positive current collector 23121f of the first positive winding end portion, so that only the negative active material layers on the outer sides of the negative current collector 23221b of the first portion in the two straight areas I may be widened so as to meet H1−L1>H2−L2.

Figure 23:
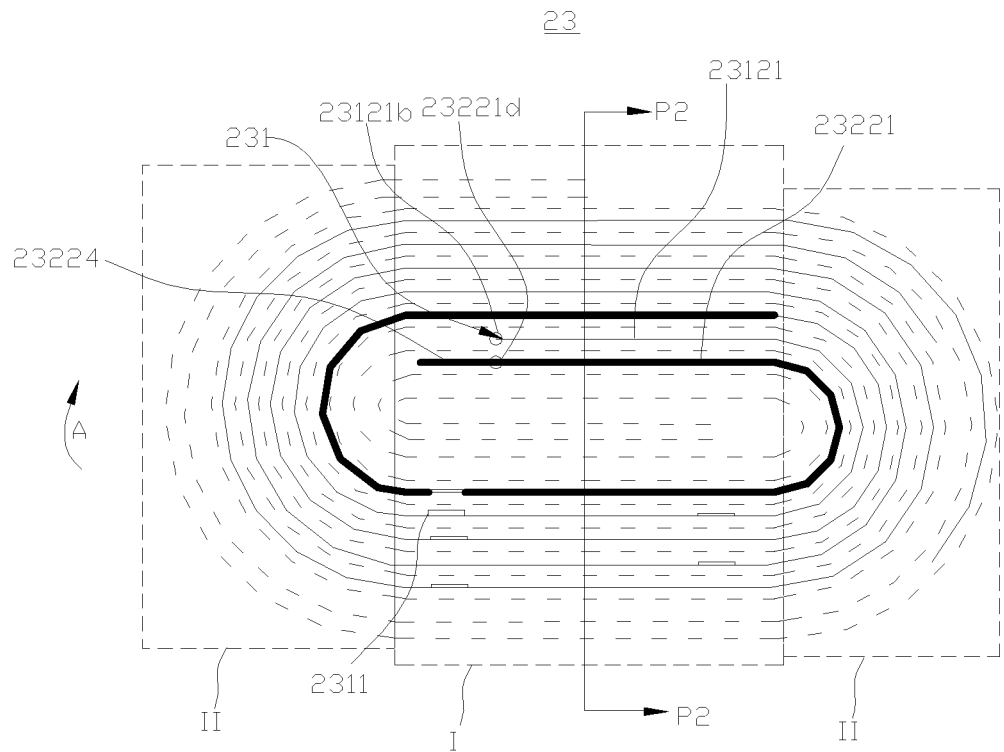
FIG. 23 is a structural schematic diagram of the electrode assembly provided by some other embodiments of the present application.
Figure 24:
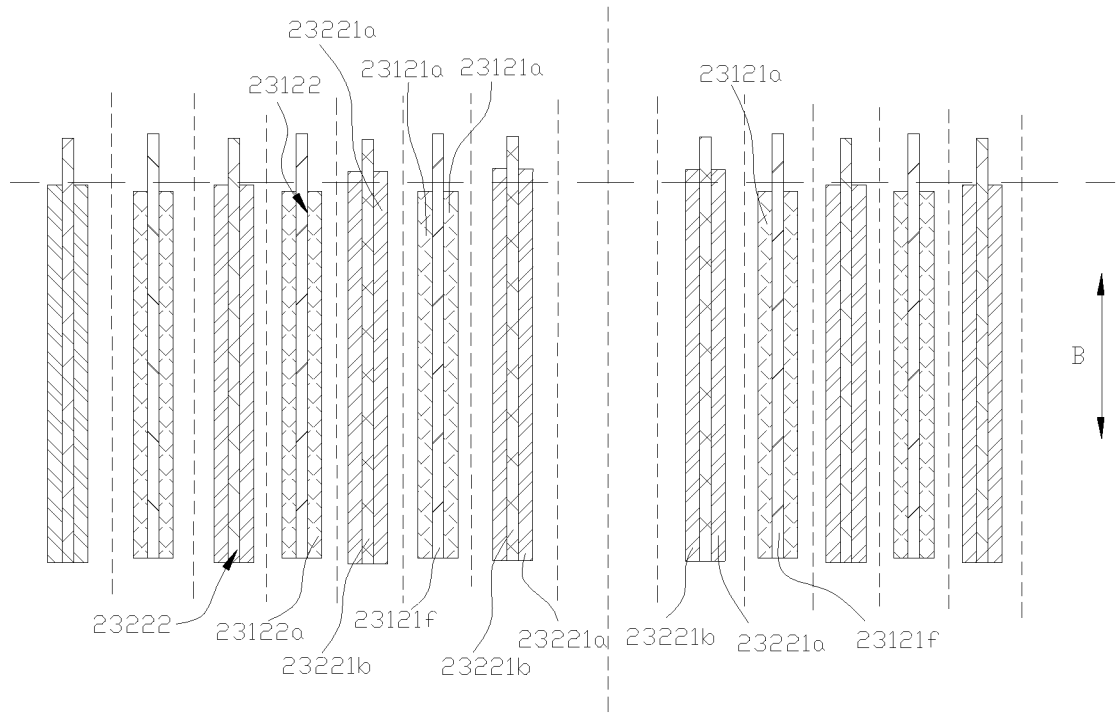
FIG. 24 is a cutaway view of a P2-P2 direction in FIG. 21 under some conditions.

In some embodiments, as shown in FIGS. 23 and 24, the first portion 23221 passes through the straight area I three times, which is divided into a straight area for first time, a straight area for second time and a straight area for third time according to a passing sequence (first→later). If the first positive winding end portion 23121 passes through the straight area I two times, a negative active material layer on an inner side of the negative current collector 23221*b* of the first portion in the straight area for third time faces a positive active material layer on an outer side of a part of the positive current collector 23121*f* of the first positive winding end portion in the straight area for first time, and negative active material layers on outer sides of parts of the negative current collector 23221*b* of the first portion in the straight area for the first time and the straight area for second time face a positive active material layer on an inner side of the positive current collector 23121*f* of the first positive winding end portion, so that in the winding axial direction B, only the negative active material layers on the outer sides of the negative current collector 23221*b* of the first portion in the straight area for the first time and the straight area for second time and the negative active material layer on the inner side of the part of the negative current collector 23221*b* of the first portion in the straight area for third time may be widened so as to meet H1−L1>H2−L2.

Figure 25:
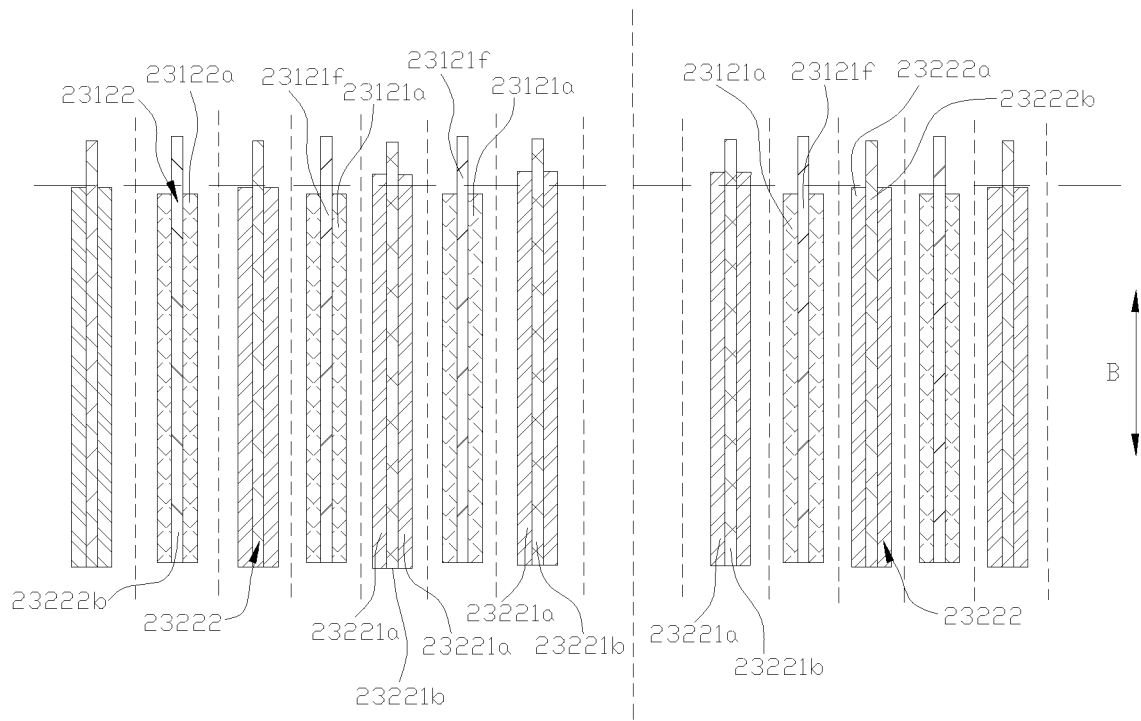
FIG. 25 is a cutaway view of the P2-P2 direction in FIG. 21 under some other conditions.

As shown in FIG. 25, if the first positive winding end portion 23121 passes through the straight area I three times, negative active material layers on the inner and outer sides of the part of the negative current collector 23221*b* of the first portion in the straight area for third time face a positive active material layer on an outer side of a part of the positive current collector 23121*f* of the first positive winding end portion in the straight area for first time and a positive active material layer on an inner side of a part of the positive current collector 23121*f* of the first positive winding end portion in the straight area for third time respectively. The negative active material layers on the outer sides of the parts of the negative current collector 23221*b* of the first portion in the straight area for the first time and the straight area for second time face positive active material layers on inner sides of the positive current collector 23121*f* of the first positive winding end portion in the straight area for the first time and the straight area for second time, so that in the winding axial direction, only the negative active material layers on the outer sides of the parts of the negative current collector 23221*b* of the first portion in the straight area for the first time and the straight area for second time and the negative active material layers on the inner and outer sides of the part of the negative current collector 23221*b* of the first portion in the straight area for third time may be widened so as to meet H1−L1>H2−L2.

In some embodiments, the winding type electrode assembly 23 is the cylindrical electrode assembly 23, and the first portion 23221 is wound at least one circle.

Figure 26:
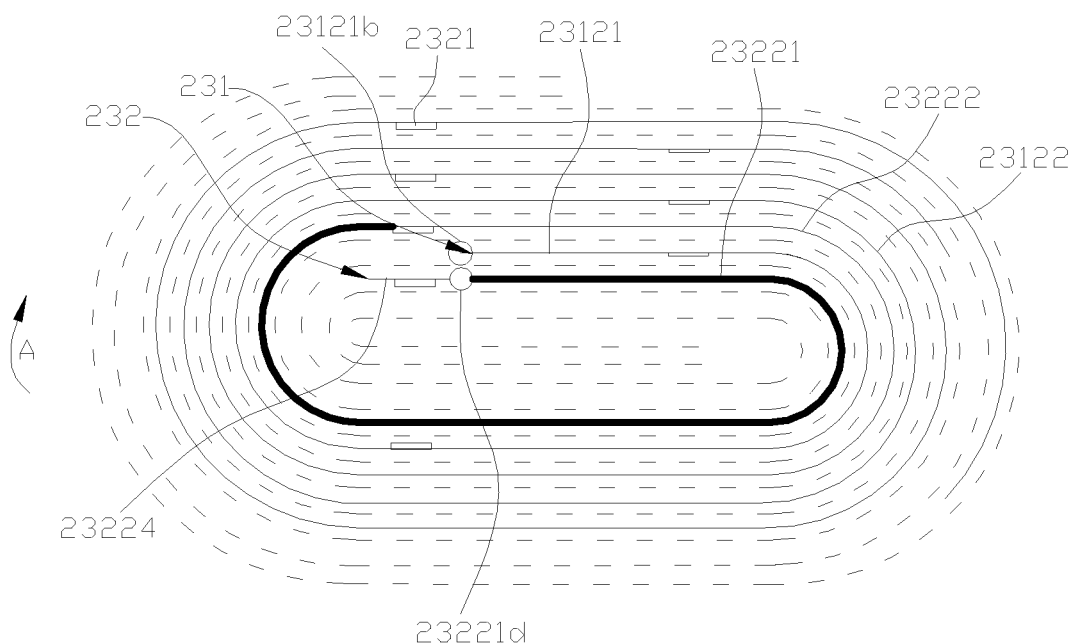
FIG. 26 is a structural schematic diagram of the electrode assembly with a first extending portion provided by some embodiments of the present application.

As shown in FIG. 26, in order to guarantee that the negative electrode plate 232 is capable of completely covering the positive electrode plate 231 in the winding direction A, the negative body 2322 further includes a first extending portion 23224. In the winding direction A, the first extending portion 23224 is connected to one end of the first portion 23221 away from the second portion 23222, and the first extending portion 23224 exceeds the start end (the start end 23121*b* of the positive winding starting section) of the first positive winding end portion 23121 in the direction opposite to the winding direction A. A width of a negative active material layer of the first extending portion 23224 in the winding axial direction B may be increased or not increased compared with that of the negative active material layer 23222*a* of the second portion. The negative active material layer of the first extending portion 23224 is widened compared with the negative active material layer 23222*a* of the second portion (with reference to FIG. 23). As shown in FIG. 26, the negative active material layer of the first extending portion 23224 is not widened compared with that of the negative active material layer 23222*a* of the second portion.

Figure 27:
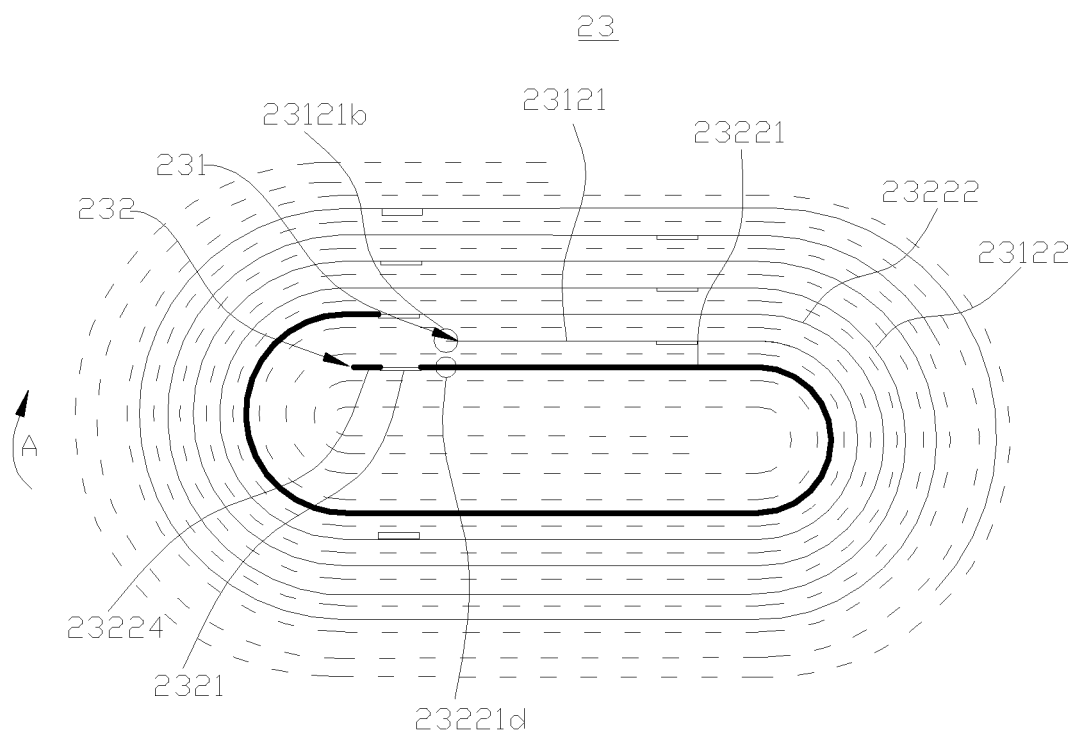
FIG. 27 is a structural schematic diagram of the electrode assembly with the first extending portion provided by some other embodiments of the present application.

In some embodiments, as shown in FIG. 27, the first extending portion 23224 is provided with the negative tab 2321 in a protruding mode, and in the winding direction A, negative active material layers of the first extending portion 23224 at two sides of the negative tab 2321 are widened compared with the negative active material layer 23222*a* of the second portion. In some embodiments, in the winding direction A, in the negative active material layers of the first extending portion 23224 at the two sides of the negative tab 2321, only one side of the negative active material layer is widened compared with the negative active material layer 23222*a* of the second portion.

Figure 28:
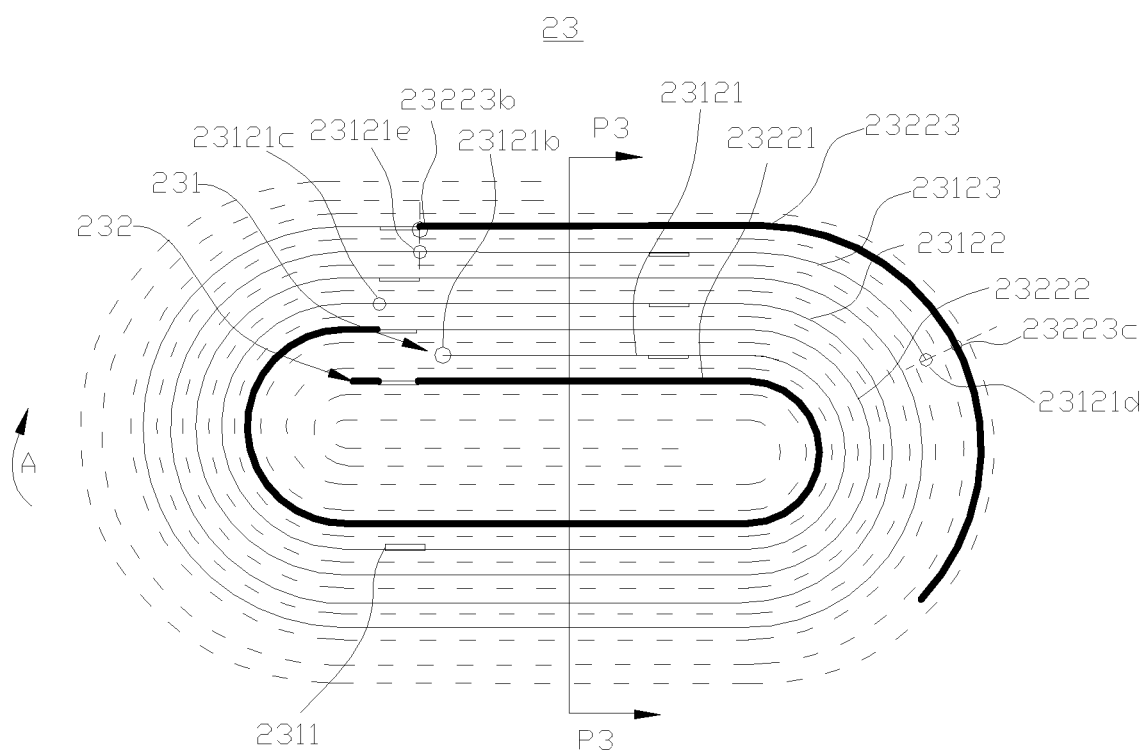
FIG. 28 is a structural schematic diagram of the electrode assembly provided by still other embodiments of the present application.

In some embodiments, as shown in FIG. 28, the positive body 2312 of the positive electrode plate 231 further includes a second positive winding end portion 23123, and the first positive winding end portion 23121 and the second positive winding end portion 23123 are connected to two ends of the positive winding middle section 23122 respectively.

The negative body 2322 of the negative electrode plate 232 further includes a third portion 23223, the first portion 23221 and the third portion 23223 are connected to two ends of the second portion 23222 respectively, and the third portion 23223 is arranged opposite to the second positive winding end portion 23123; and a maximum width of a negative active material layer 23223*a* of the third portion is H4, a minimum width of a positive active material layer 23123*a* of the second positive winding end portion is L3, and H4−L3>H2−L2.

In some embodiments, the first positive winding end portion 23121 is the positive winding starting section, and the second positive winding end portion 23123 is the positive winding ending section. The first positive winding end portion 23121 is the positive body 2312 wound for a certain distance from the start end 23121*b* of the positive winding starting section in the winding direction A of the winding type electrode assembly 23, and the positive winding middle section 23122 is the positive body 2312 connected to the tail end of the first positive winding end portion 23121 (the tail end 23121*c* of the positive winding starting section) and wound in the winding direction A of the winding type electrode assembly 23 for a certain distance. The second positive winding end portion 23123 is a positive body 2312 wound for a certain distance from a tail end 23121*d* (a tail end of the second positive winding end portion 23123) of the positive winding ending section in the direction opposite to the winding direction A of the winding type electrode assembly 23, and the positive winding middle section 23122 is a positive body 2312 connected to a start end of the second positive winding end portion 23123 (the start end 23121*e* of the positive winding ending section) and wound in the direction opposite to the winding direction A of the winding type electrode assembly 23 for a certain distance.

The third portion 23223 is arranged opposite to the second positive winding end portion 23123, that is, the third portion 23223 is arranged opposite to the positive winding ending section, which is further described as that a start end 23223*b* of the third portion corresponds to the start end of the second positive winding end portion 23123 (the start end 23121*e* of the positive winding ending section), and a tail end 23223*c* of the third portion corresponds to the tail end of the second positive winding end portion 23123 (the tail end 23121*d* of the positive winding ending section).

The maximum width difference between the positive active material layer 23121*a* of the first positive winding end portion and the negative active material layer 23221*a* of the first portion is larger than the maximum width difference between the negative active material layer 23222*a* of the second portion and the positive active material layer 23122*a* of the positive winding middle section, and the maximum width difference between the positive active material layer 23123*a* of the second positive winding end portion and the negative active material layer 23223*a* of the third portion is larger than a maximum width difference between the negative active material layer 23222*a* of the second portion and the positive active material layer 23122*a* of the positive winding middle section, so that the risk of the lithium plating caused by the reason that the size of the part, exceeding the positive active material layer of the positive electrode plate 231 in the winding axial direction, of the negative active material layer of the negative electrode plate 232 does not meet the design requirement due to relative deviation between the head of the positive electrode plate 231 and the head of the negative electrode plate 232 and between the tail of positive electrode plate 231 and the tail of the negative electrode plate 232 may be reduced.

Figure 29:
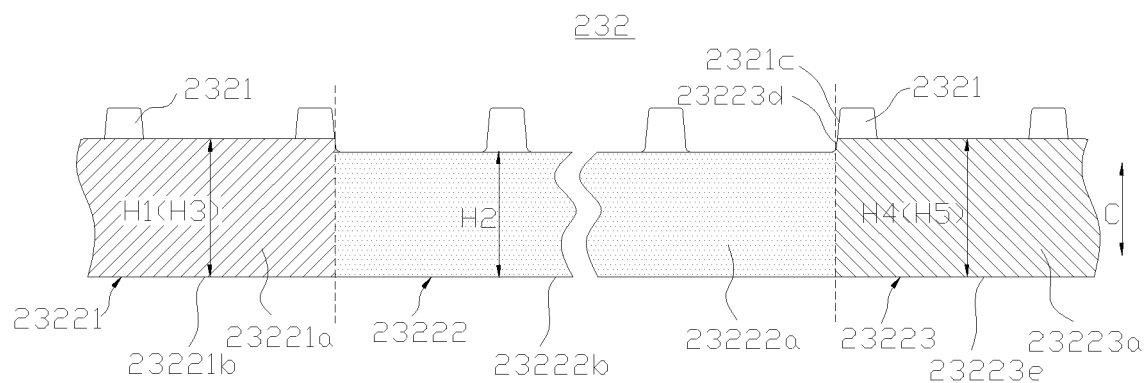
FIG. 29 is a structural schematic diagram of the negative electrode plate with the first portion, the second portion and a third portion provided by some embodiments of the present application.

In some embodiments, as shown in FIGS. 28 and 29, H4>H2. Due to the fact that the third portion 23223 is arranged opposite to the second positive winding end portion 23123 and the second portion 23222 is arranged opposite to the positive winding middle section 23122, the maximum width of the negative active material layer 23223*a* of the third portion is larger than the maximum width of the negative active material layer 23222*a* of the second portion, which means that the negative active material layer 23223*a* of the third portion is widened compared with the negative active material layer 23222*a* of the second portion, so that on the premise of guaranteeing the energy density, the risk of the lithium plating caused by the reason that the size of the part, exceeding the positive active material layer of the positive electrode plate 231 in the winding axial direction B, of the negative active material layer of the negative electrode plate 232 does not meet the design requirement may be reduced.

In some embodiments, a minimum width of the negative active material layer 23223*a* of the third portion is H5, and H5≥H2. The minimum width of the negative active material layer 23223*a* of the third portion is not less than the maximum width of the negative active material layer 23222*a* of the second portion, so that the risk of the lithium plating caused by the reason that a size of a part, exceeding the positive active material layer 23123*a* of the second positive winding end portion in the winding axial direction B, of the negative active material layer 23223*a* of the third portion does not meet the design requirement is reduced.

A structure of the third portion 23223 may refer to that of the first portion 23221, a structural relation between the third portion 23223 and the second portion 23222 may refer to that between the first portion 23221 and the second portion 23222, a structure of the second positive winding end portion 23123 may refer to that of the first positive winding end portion 23121, and a relative relation between the second positive winding end portion 23123 and the third portion 23223 may refer to that between the first positive winding end portion 23121 and the first portion 23221, which will not be described in detail herein.

With further reference to FIG. 29, in the winding axial direction B (consistent with the shown width direction C), the negative tab 2321 is located at one end of the negative electrode plate 232, one end of the negative active material layer 23223*a* of the third portion close to the negative tab 2321 exceeds a corresponding end of the negative active material layer 23222*a* of the second portion, and the other end of the negative active material layer 23223*a* of the third portion is flush with the other end of the negative active material layer 23222*a* of the second portion. In the winding axial direction B, the end of the negative active material layer 23223*a* of the third portion close to the negative tab 2321 completely exceeds the corresponding end of the negative active material layer 23222*a* of the second portion, and the other end of the negative active material layer 23223*a* of the third portion is flush with the other end of the negative active material layer 23222*a* of the second portion.

One end of the third portion 23223 close to the negative tab 2321 exceeds a corresponding end of the second portion 23222, and the other end of the third portion 23223 is flush with the other end of the second portion 23222. It may be understood that one end of a negative current collector 23223*e* of the third portion close to the negative tab 2321 exceeds a corresponding end of the negative current collector 23222*b* of the second portion, and the other end of the negative current collector 23223*e* of the third portion is flush with the other end of the negative current collector 23222*b* of the second portion; one end of the negative active material layer 23223*a* of the third portion close to the negative tab 2321 exceeds the corresponding end of the negative active material layer 23222*a* of the second portion, and the other end of the negative active material layer 23223*a* of the third portion is flush with the other end of the negative active material layer 23222*a* of the second portion; one end of the negative current collector 23223*e* of the third portion close to the negative tab 2321 is flush with one end of the negative active material layer 23223*a* of the third portion close to the negative tab 2321, and the other end of the negative current collector 23223*e* of the third portion is flush with the other end of the negative active material layer 23221*a* of the first portion; and one end of the negative current collector 23222*b* of the second portion close to the negative tab 2321 is flush with one end of the negative active material layer 23222*a* of the second portion close to the negative tab 2321, and the other end of the negative current collector 23222*b* of the second portion is flush with the other end of the negative active material layer 23222*a* of the second portion. The negative electrode plate 232 not only facilitates coating of the negative active material layer, but also may form the negative electrode plate 232 with a width difference between the third portion 23223 in the process of forming the negative tab 2321 through the die cutting, that is, the negative electrode plate with the width difference between the third portion 23223 and the second portion 23222 may be formed by using the original forming process of the negative electrode plate 232.

The third portion 23223 is provided with a combining face 23223*d* connected to the second portion 23222; and negative tabs 2321 are multiple in quantity, one negative tab 2321 of the multiple negative tabs 2321 protrudes out of the third portion 23223 in the winding axial direction B and is provided with a second side face 2321*c* close to the second portion 23222, and the second side face 2321*c* and the combining face 23223*d* are coplanar. The combining face 23223*d* and one side face of the negative tab 2321 are coplanar, so that a situation that the combining face 23223*d* warps due to no binding and then punctures the separator film 233 during and after winding may be avoided.

Figure 30:
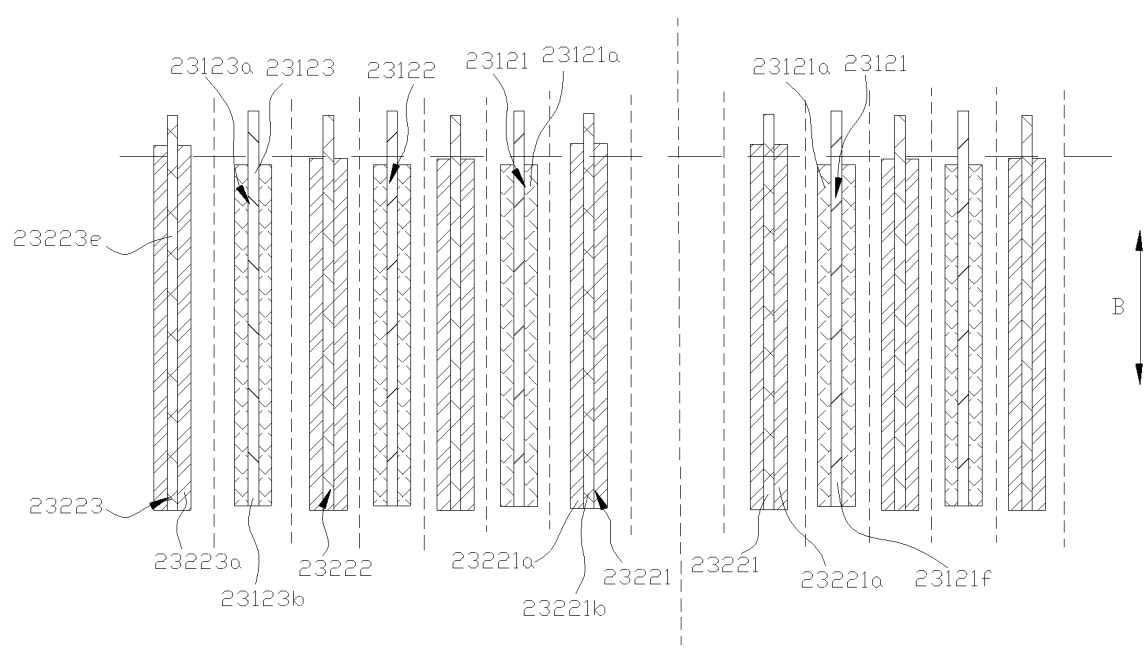
FIG. 30 is a cutaway view of a P3-P3 direction in FIG. 28.

The third portion 23223 passes through the straight area I at least one time. In some embodiments, as shown in FIGS. 28 and 30, the third portion 23223 passes through the straight area I one time, the second positive winding end portion 23123 passes through the straight area I one time, and a negative active material layer on an inner side of the negative current collector 23223e of the third portion faces a positive active material layer on an outer side of a positive current collector 23123b of the second positive winding end portion, so that only the negative active material layer on the inner side of the negative current collector 23223e of the third portion may be widened so as to meet H4−L3>H2−L2.

In some embodiments, if an outer diameter of the winding needle for forming the electrode assembly 23 through winding is small, the number of times of passing through the straight area I by the third portion may be appropriately increased.

Figure 31:
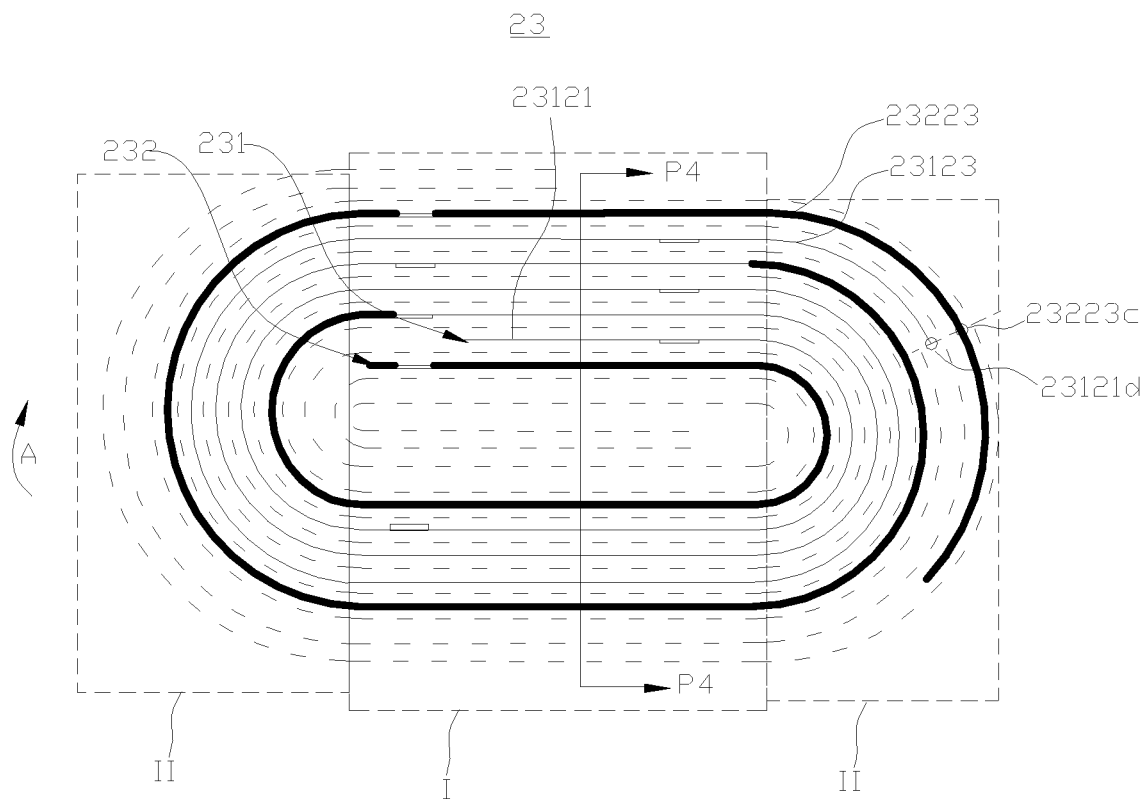
FIG. 31 is a structural schematic diagram of the winding type electrode assembly provided by some other embodiments of the present application.
Figure 32:
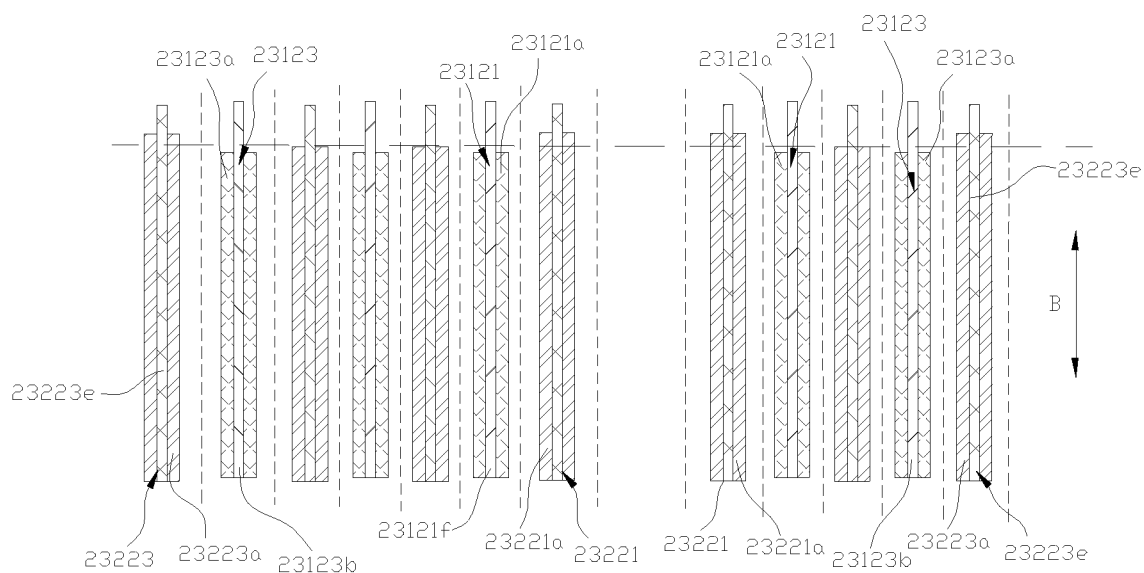
FIG. 32 is a cutaway view of a P4-P4 direction in FIG. 29.

In some embodiments, as shown in FIGS. 31 and 32, the third portion 23223 passes through the straight area I two times, and negative active material layers on inner sides of parts of the negative current collector 23223e of the third portion in the two straight areas I face a positive active material layer on an outer side of the positive current collector 23123b of the second positive winding end portion, so that only the negative active material layers on the inner sides of the parts of the negative current collector 23223e of the third portion in the two straight areas I may be widened so as to meet H4−L3>H2−L2.

Figure 33:
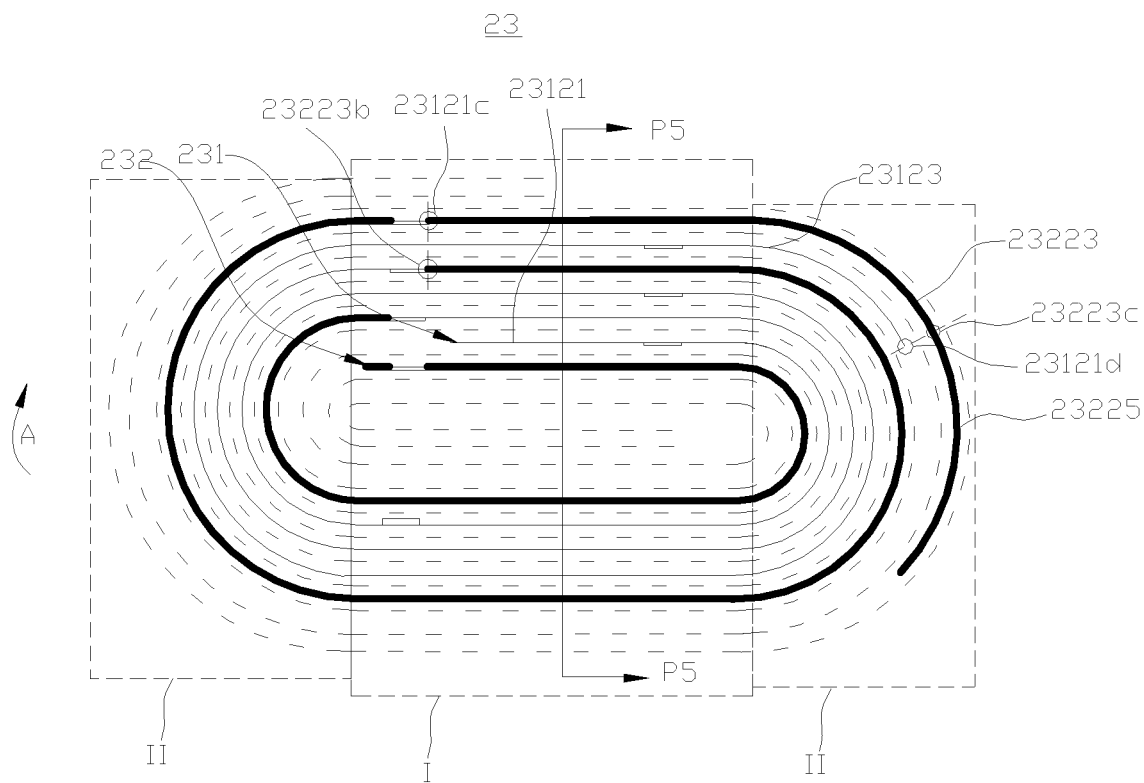
FIG. 33 is a structural schematic diagram of the electrode assembly provided by some other embodiments of the present application.
Figure 34:
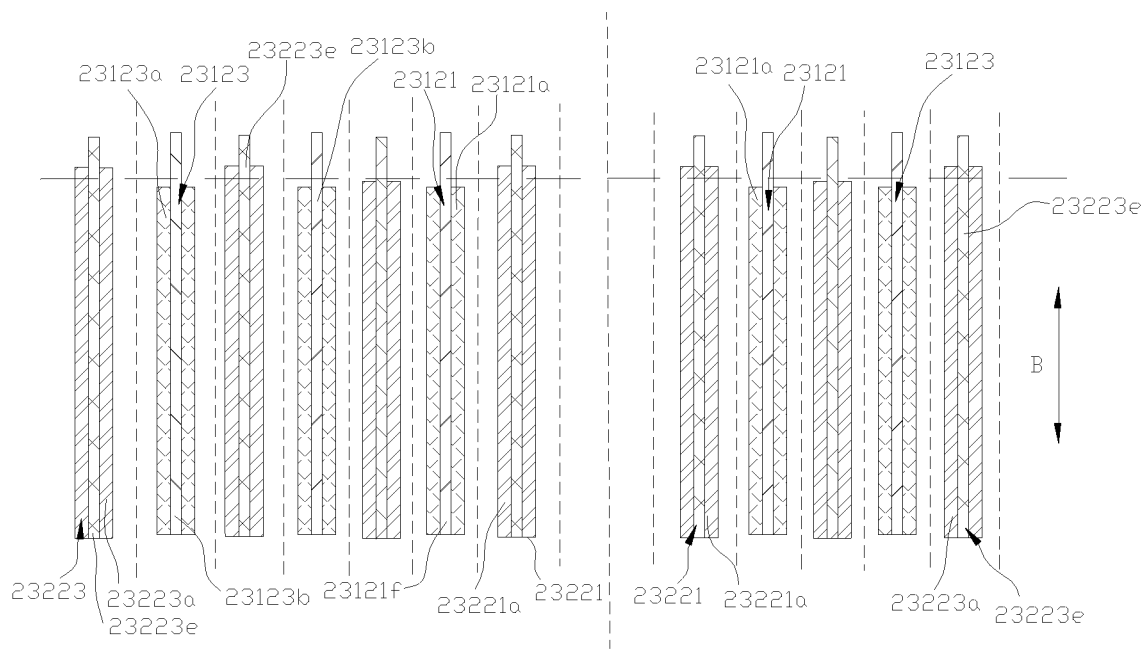
FIG. 34 is a cutaway view of a P5-P5 direction in FIG. 31 under some conditions.

In some embodiments, as shown in FIGS. 33 and 34, in the winding direction A, the third portion 23223 passes through the straight area I three times, the second positive winding end portion 23123 passes through the straight area I three times, which is divided into a straight area for first time, a straight area for second time and a straight area for third time according to a passing sequence (first→later). Negative active material layers on inner and outer sides of a part of the negative current collector 23223e of the third portion in the straight area for first time face a positive active material layer on an outer side of a part of the positive current collector 23123b of the second positive winding end portion in the straight area for first time and a positive active material layer on an inner side of a part of the positive current collector 23123b of the second positive winding end portion in the straight area for third time respectively, and negative active material layers on inner sides of parts of the negative current collector 23222b of the second portion in the straight area for second time and the straight area for third time face positive active material layers on outer sides of parts of the positive current collector 23123b of the second positive winding end portion in the straight area for second time and the straight area for third time, so that in the winding axial direction B, only the negative active material layers on the inner and outer sides of the part of the negative current collector 23223e of the third portion in the straight area for first time and the negative active material layers on the inner sides of the parts of the negative current collector 23222b of the second portion in the straight area for second time and the straight area for third time may be widened so as to meet H4−L3>H2−L2.

Figure 35:
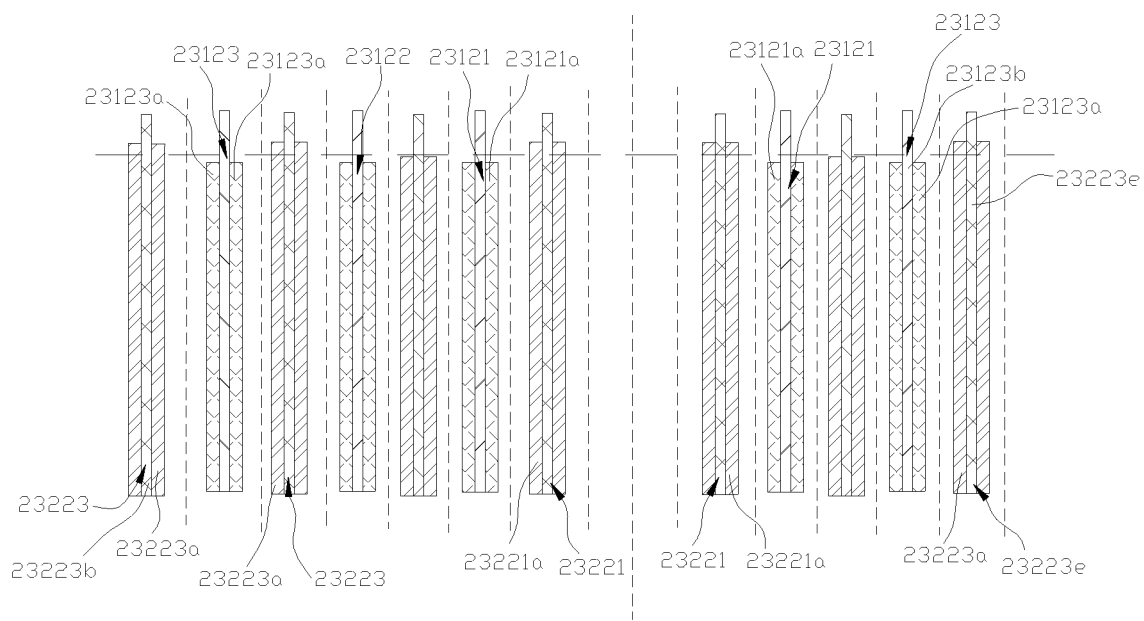
FIG. 35 is a cutaway view of the P5-P5 direction in FIG. 31 under some other conditions.

As shown in FIG. 35, if the third portion 23223 passes through the straight area I three times, the second positive winding end portion 23123 passes through the straight area I two times, positive active material layers on inner and outer sides of a part of the positive current collector 23123b of the second positive winding end portion in the straight area for second time face a negative active material layer on an outer side of a part of the negative current collector 23223e of the third portion in the straight area for first time and a negative active material layer on an inner side of a part of the negative current collector 23223e of the third portion in the straight area for third time respectively, and a positive active material layer on an outer side of a part of the positive current collector 23123b of the second positive winding end portion in the straight area for first time faces a negative active material layer on an inner side of a part of the negative current collector 23223e of the third portion in the straight area for second time. In the winding axial direction B, only the negative active material layer on the outer side of the part of the negative current collector 23223e of the third portion in the straight area for first time and negative active material layers on inner sides of parts of the negative current collector 23223e of the third portion in the straight area for second time and the straight area for third time may be widened so as to meet H4−L3>H2−L2.

Figure 36:
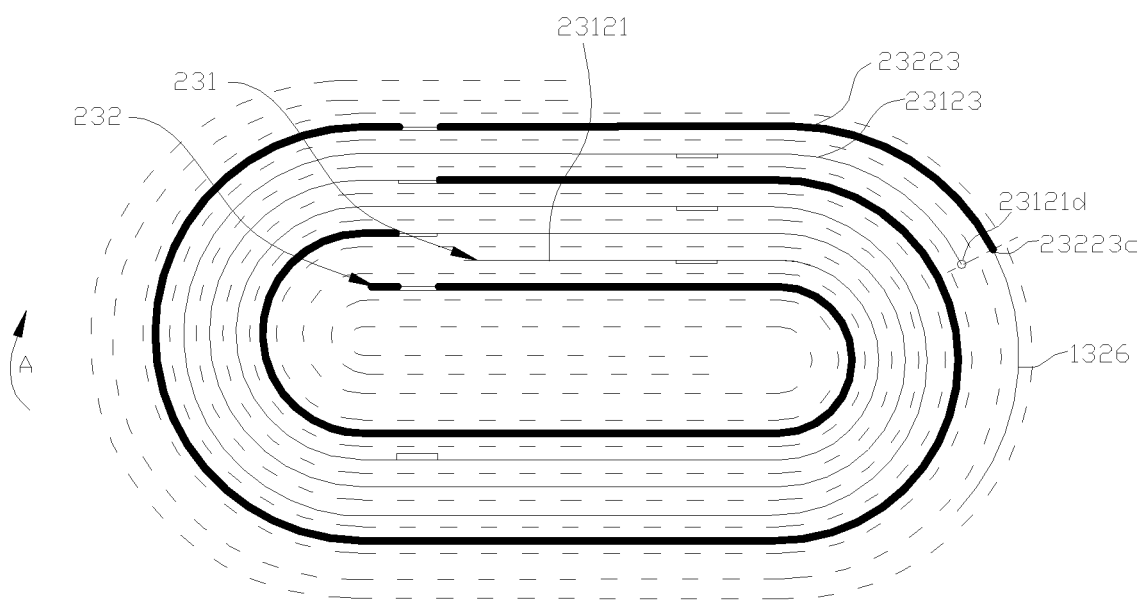
FIG. 36 is a structural schematic diagram of the electrode assembly with a second extending portion provided by some embodiments of the present application.

In order to guarantee that the negative electrode plate 232 is capable of completely covering the positive electrode plate 231 in the winding direction A, the negative body 2322 further includes a second extending portion 23225. In the winding direction A, the second extending portion 23225 is connected to one end of the third portion 23223 away from the second portion 23222, and the second extending portion 23225 exceeds the tail end of the second positive winding end portion 23123 in the winding direction A. The second extending portion 23225 may be widened or not widened compared with the second portion 23222. In FIG. 33, the second extending portion 23225 is widened compared with the second portion 23222, and in FIG. 36, a negative active material layer of the second extending portion 23225 is not widened compared with the negative active material layer 23222a of the second portion.

In some embodiments, the third portion 23223 may also be wound a circle. For example, when the winding type electrode assembly 23 is of a cylindrical structure, the third portion 23223 is wound at least one circle.

In some embodiments, a structure of the positive electrode plate 231 is improved so as to enable the maximum width difference between the positive active material layer 23121a of the first positive winding end portion and the negative active material layer 23221a of the first portion to be larger than the maximum width difference between the negative active material layer 23222a of the second portion and the positive active material layer 23122a of the positive winding middle section.

Figure 37:
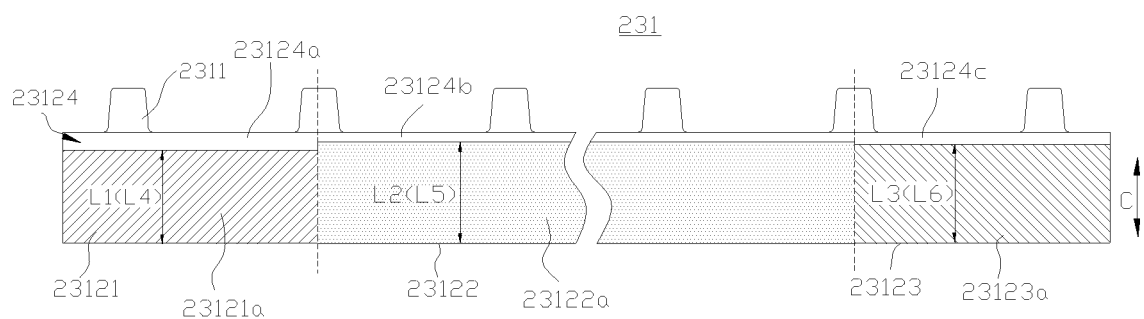
FIG. 37 is a structural schematic diagram of a positive electrode plate provided by some embodiments of the present application.

In some embodiments, as shown in FIG. 37, in the winding axial direction B (consistent with the shown width direction C), a maximum width of the positive active material layer 23121a of the first positive winding end portion is L4, a maximum width of the positive active material layer 23122a of the positive winding middle section is L5, and L4<L5, so that a maximum width difference between the first positive winding end portion 23121 and the first portion 23221 is larger than a maximum width difference between the negative active material layer 23222a of the second portion and the positive active material layer 23122a of the positive winding middle section, and by changing a width of the first positive winding end portion 23121 of the positive electrode plate 231, the risk that the size of the part, exceeding the positive active material layer of the positive electrode plate 231 in the winding axial direction B, of the negative active material layer of the negative electrode plate 232 does not meet the design requirement due to the relative deviation between the positive electrode plate 231 and the negative electrode plate 232 is reduced.

In some embodiments, with further reference to FIG. 37, a maximum width of the positive active material layer 23123*a* of the second positive winding end portion is L6, the maximum width of the positive active material layer 23122*a* of the positive winding middle section is L5, and L6<L5, so that a maximum width difference between the positive active material layer 23121*a* of the first positive winding end portion and the negative active material layer 23221*a* of the first portion is larger than a maximum width difference between the negative active material layer 23222*a* of the second portion and the positive active material layer 23122*a* of the positive winding middle section, a maximum width difference between the positive active material layer 23123*a* of the second positive winding end portion and the negative active material layer 23223*a* of the third portion is larger than a maximum width difference between the negative active material layer 23222*a* of the second portion and the positive active material layer 23122*a* of the positive winding middle section, and the risk that the size of the part, exceeding the positive active material layer of the positive electrode plate 231 in the winding axial direction B, of the negative active material layer of the negative electrode plate 232 does not meet the design requirement due to the relative deviation between the head and the tail of the negative electrode plate 232 during winding is reduced.

The maximum width difference between the positive active material layer 23123*a* of the second positive winding end portion and the negative active material layer 23223*a* of the third portion is H4−L3.

In some embodiments, the positive active material layer 23121*a* of the first positive winding end portion may be of an equal-width structure, and L1=L4. Or, the positive active material layer 23121*a* of the first positive winding end portion may be of a variable-width structure, and L1<L4.

In some embodiments, the positive active material layer 23122*a* of the positive winding middle section may be of an equal-width structure, and L2=L5. Or, the positive active material layer 23122*a* of the positive winding middle section may be of a variable-width structure, and L2<L5.

In some embodiments, the positive active material layer 23123*a* of the second positive winding end portion may be of an equal-width structure, and L6=L3. Or, the positive active material layer 23123*a* of the second positive winding end portion may be of a variable-width structure, and L3<L6.

In some embodiments, in the winding axial direction B, one end of the positive active material layer 23122*a* of the positive winding middle section at least partially exceeds the corresponding end of the positive active material layer 23121*a* of the first positive winding end portion, and the other end of the positive active material layer 23122*a* of the positive winding middle section is flush with the other end of the positive active material layer 23121*a* of the first positive winding end portion. In this way, the width of the first positive winding end portion 23121 is reduced from one side in the winding axial direction B relative to the positive winding middle section 23122, so that a forming mode of the positive electrode plate 231 is simple and processing difficulty is reduced.

In some embodiments, in the winding axial direction B, the positive tab 2311 is located at one end of the positive electrode plate 231, and one end of the positive active material layer 23122*a* of the positive winding middle section close to the positive tab 2311 exceeds the corresponding end of the positive active material layer 23121*a* of the first positive winding end portion. One end of the positive active material layer 23122*a* of the positive winding middle section close to the positive tab 2311 exceeds the corresponding end of the positive active material layer 23123*a* of the second positive winding end portion. In this way, in a process of forming the positive tab 2311 through the die cutting or in a process of arranging an insulating layer 23124, the positive electrode plate 231 with a width difference between the positive active material layer 23121*a* of the first positive winding end portion as well as the positive active material layer 23123*a* of the second positive winding end portion and the positive active material layer 23122*a* of the positive winding middle section may be formed, thus reducing the processing difficulty.

Generally, the positive electrode plate 231 further includes the insulating layer 23124, and the insulating layer 23124 is configured to separate burrs at one end of the positive body 2312 in the winding axial direction B from the negative body 2322 (shown in FIG. 18) to reduce the short circuit risk. In the winding axial direction B, the insulating layer 23124 is arranged between the positive tab 2311 and the positive active material layer on the positive body 2312, and the insulating layer 23124 is coated in the positive current collector of the positive body 2312, so that the larger a width occupied by the insulating layer 23124, the smaller a width of the positive active material layer with a corresponding position capable of being subjected to coating, otherwise, the smaller the width occupied by the insulating layer 23124, the larger the width of the positive active material layer with the corresponding position capable of being subjected to coating. Therefore, a minimum width of an insulating layer 23124*a* of the first positive winding end portion is larger than a maximum width of an insulating layer 23124*b* of the positive winding middle section. A minimum width of an insulating layer 23124*c* of the second positive winding end portion is larger than the maximum width of the insulating layer 23124*b* of the positive winding middle section.

The insulating layer 23124 includes an inorganic filler and an adhesive. The inorganic filler includes one or more of boehmite, alumina, magnesia, titania, zirconia, silica, silicon carbide, boron carbide, calcium carbonate, aluminum silicate, calcium silicate, potassium titanate and barium sulfate. The adhesive includes one or more of polyvinylidene fluoride, polyacrylonitrile, polyacrylic acid, polyacrylate, polyacrylic acid-acrylate, polyacrylonitrile-acrylic acid and polyacrylonitrile-acrylate.

In some embodiments, in the winding axial direction B, the widths of the first positive winding end portion 23121, the positive winding middle section 23122 and the positive active material layer 23123*a* of the second positive winding end portion are consistent, the insulating layer 23124 is coated in one sides of the first positive winding end portion 23121 close to the positive tab 2311, the positive winding middle section 23122 and the positive active material layer 23123*a* of the second positive winding end portion, and the insulating layer 23124 is applied to the positive active material layer, so that the insulating layer 23124 overlaps with the positive active material layer, and the positive active material layer not covered by the insulating layer 23124 is an effective active material layer of the positive body 2312. The maximum widths of the insulating layer 23124*a* of the first positive winding end portion and the insulating layer 23124*c* of the second positive winding end portion are both larger than the maximum width of the insulating layer 23124*b* of the positive winding middle section, so that maximum widths of an effective active material layer of the first positive winding end portion 23121 and an effective active material layer of the second positive winding end portion 23123 are both smaller than a maximum width of an effective positive active material layer of the positive winding middle section 23122.

Figure 38:
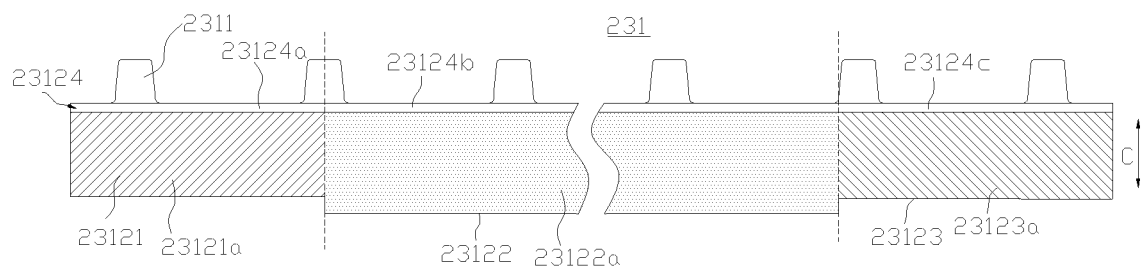
FIG. 38 is a structural schematic diagram of the positive electrode plate provided by some other embodiments of the present application.

In some embodiments, as shown in FIG. 38, in the winding axial direction B (consistent with the width direction C), it may also be one end of the positive active material layer 23122a of the positive winding middle section away from the positive tab 2311 that exceeds a corresponding end of the positive active material layer 23121a of the first positive winding end portion. One end of the positive active material layer 23122a of the positive winding middle section away from the positive tab 2311 exceeds the corresponding end of the positive active material layer 23123a of the second positive winding end portion.

Figure 39:
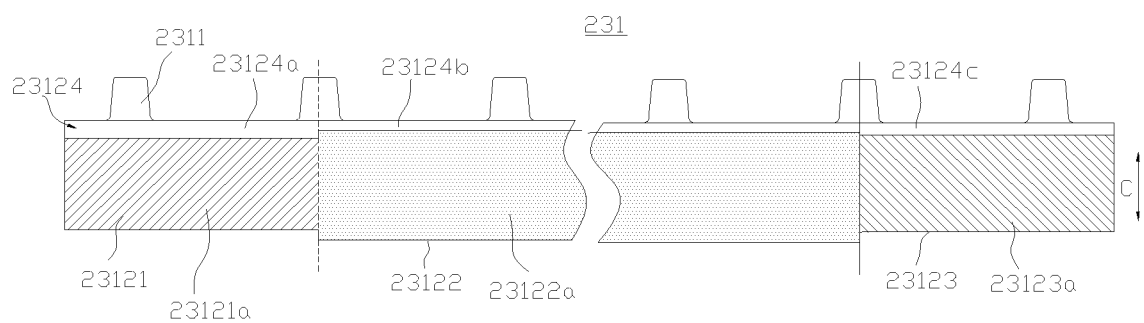
FIG. 39 is a structural schematic diagram of the positive electrode plate provided by some other embodiments of the present application.

In some embodiments, as shown in FIG. 39, in the winding axial direction B (consistent with the width direction C), it may also be two ends of the positive active material layer 23122a of the positive winding middle section that exceed two ends of the positive active material layer 23121a of the first positive winding end portion correspondingly. The two ends of the positive active material layer 23122a of the positive winding middle section exceeds the two end of the positive active material layer 23123a of the second positive winding end portion correspondingly.

In some embodiments, the structures of the positive electrode plate 231 and the negative electrode plate 232 are improved to meet H1−L1>H2−L2 and H4−L3>H2−L2. Under the condition that part or all of the width of the negative active material layer 23221a of the first portion is partially or completely increased, part or all of the width of the positive active material layer 23121a of the first positive winding end portion is decreased. Under the condition that part or all of the width of the negative active material layer 23223a of the third portion is increased, the part or all of width of the positive active material layer 23123a of the second positive winding end portion is decreased.

In some embodiments, the negative active material layer 23223a of the third portion is not widened compared with the negative active material layer 23222a of the second portion, and by increasing a size of the negative active material layer 23221a of the first portion in the winding axial direction B and decreasing a size of the positive active material layer 23123a of the second positive winding end portion in the winding axial direction B, H1−L1>H2−L2 and H4−L3>H2−L2 are met.

In some embodiments, the negative active material layer 23221a of the first portion is not widened compared with the negative active material layer 23222a of the second portion, and by decreasing a size of the positive active material layer 23121a of the first positive winding end portion in the winding axial direction B and increasing a size of the negative active material layer 23223a of the third portion in the winding axial direction B, H1−L1>H2−L2 and H4−L3>H2−L2 are met.

Figure 40:
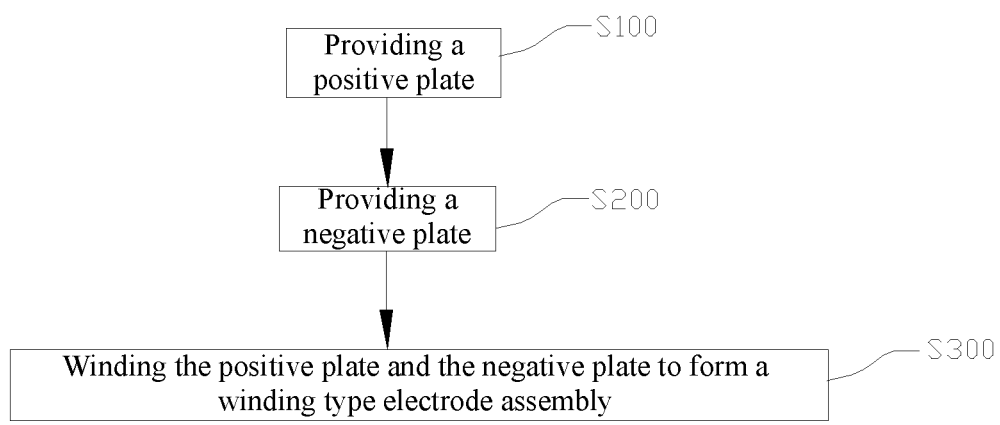
FIG. 40 is a flowchart of a method for manufacturing an electrode assembly provided by some embodiments of the present application.

The embodiments of the present application further provide the method for manufacturing a winding type electrode assembly 23, and as shown in FIG. 40, the method for manufacturing a winding type electrode assembly 23 includes that S100: providing a positive electrode plate 231, the positive electrode plate 231 including a first positive winding end portion 23121 and a positive winding middle section 23122 connected to each other;

S200: providing a negative electrode plate 232, the negative electrode plate 232 including a first portion 23221 and a second portion 23222 connected to each other; and S300: winding the positive electrode plate 231 and the negative electrode plate 232 to form the winding type electrode assembly 23, so that the first portion 23221 is arranged opposite to the first positive winding end portion 23121, and the second portion 23222 is arranged opposite to the positive winding middle section 23122; and in a winding axial direction B of the winding type electrode assembly 23, a negative active material layer of the negative electrode plate 232 exceeds a positive active material layer of the positive electrode plate 231, a maximum width of a negative active material layer 23221a of the first portion is H1, a minimum width of a positive active material layer 23121a of the first positive winding end portion is L1, a maximum width of a negative active material layer 23222a of the second portion is H2, a minimum width of a positive active material layer 23122a of the positive winding middle section is L2, and H1−L1>H2−L2.

In the present application, an execution sequence of all the steps of the method for manufacturing a winding type electrode assembly 23 is not limited, as long as the electrode assembly 23 is manufactured.

Figure 41:
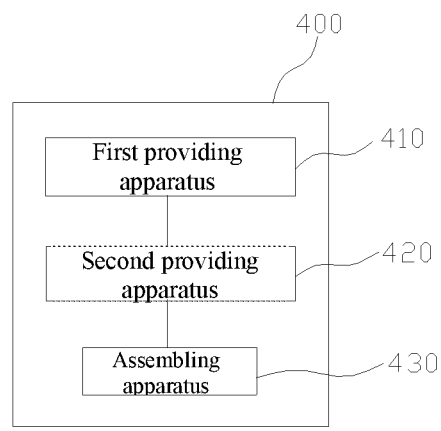
FIG. 41 is a structural schematic block diagram of a device for manufacturing an electrode assembly provided by some embodiments of the present application.

The embodiments of the present application provide the apparatus 400 for manufacturing a winding type electrode assembly. As shown in FIG. 41, the apparatus 400 for manufacturing a winding type electrode assembly includes a first providing apparatus 410, a second providing apparatus 420 and an assembling apparatus 430, where the first providing apparatus 410 is configured to provide a positive electrode plate 231, the positive electrode plate 231 including a first positive winding end portion 23121 and a positive winding middle section 23122 connected to each other; the second providing apparatus 420 is configured to provide a negative electrode plate 232, the negative electrode plate 232 including a first portion 23221 and a second portion 23222 connected to each other; and the assembling apparatus 430 is configured to wind the positive electrode plate 231 and the negative electrode plate 232, so as to enable the first portion 23221 to be arranged opposite to the first positive winding end portion 23121, and enable the second portion 23222 to be arranged opposite to the positive winding middle section 23122, in a winding axial direction B of the winding type electrode assembly 23, a negative active material layer of the negative electrode plate 232 exceeds a positive active material layer of the positive electrode plate 231, a maximum width of a negative active material layer 23221a of the first portion is H1, a minimum width of a positive active material layer 23121a of the first positive winding end portion is L1, a maximum width of a negative active material layer 23222a of the second portion is H2, a minimum width of a positive active material layer 23122a of the positive winding middle section is L2, and H1−L1>H2−L2.

The positive electrode plate 231 and the negative electrode plate 232 provided by the first providing apparatus 410 and the second providing apparatus 420 may overcome a defect that the part, exceeding the positive active material layer of the positive electrode plate 231, of the negative active material layer of the negative electrode plate 232 is not enough due to the relative deviation of the positive electrode plate 231 and the negative electrode plate 232 at the head or tail caused by a structural tolerance and a winding error of the assembling apparatus 430 in a process of forming the winding type electrode assembly 23 through winding.

Although the present application has been described with reference to preferred embodiments, various modifications may be made and equivalents may be substituted for parts thereof without departing from the scope of the present application. Especially, as long as there is no structural conflict, the technical features mentioned in the embodiments may be combined in any way. The present application is not limited to the specific embodiments disclosed herein, but includes all technical solutions falling within the scope of the claims.

What is claimed is:

1. A winding type electrode assembly, comprising:
a positive electrode plate comprising a first positive winding end portion, a second positive winding end portion and a positive winding middle section, wherein the first positive winding end portion and the second positive winding end portion are connected to two ends of the positive winding middle section respectively, the first positive winding end portion is a positive winding starting section, and the second positive winding end portion is a positive winding ending section; and
a negative electrode plate comprising a first portion and a second portion connected to each other, wherein the first portion is arranged opposite to the first positive winding end portion, and the second portion is arranged opposite to the positive winding middle section; and
in a winding axial direction of the winding type electrode assembly, a negative active material layer of the negative electrode plate exceeds a positive active material layer of the positive electrode plate, a maximum width of a negative active material layer of the first portion is H1, a minimum width of a positive active material layer of the first positive winding end portion is L1, a maximum width of a negative active material layer of the second portion is H2, a minimum width of a positive active material layer of the positive winding middle section is L2, and H1−L1>H2−L2.

2. The winding type electrode assembly according to claim 1, wherein a minimum width of the negative active material layer of the first portion is H3, wherein H1>H2, and H3≥H2.

3. The winding type electrode assembly according to claim 2, wherein in the winding axial direction, at least part of one end of the negative active material layer of the first portion exceeds a corresponding end of the negative active material layer of the second portion, and the other end of the negative active material layer of the first portion is flush with the other end of the negative active material layer of the second portion.

4. The winding type electrode assembly according to claim 3, wherein the negative electrode plate further comprises a negative tab, in the winding axial direction, the negative tab is located at one end of the negative electrode plate, and one end of the negative active material layer of the first portion close to the negative tab at least partially exceeds a corresponding end of the negative active material layer of the second portion.

5. The winding type electrode assembly according to claim 1, wherein 0.3 mm≤H1−H2≤3 mm.

6. The winding type electrode assembly according to claim 1, wherein the negative electrode plate further comprises a negative tab, in the winding axial direction, the negative tab is located at one end of the negative electrode plate, one end of the first portion close to the negative tab exceeds a corresponding end of the second portion, and the other end of the first portion is flush with the other end of the second portion.

7. The winding type electrode assembly according to claim 6, wherein in a winding direction of the winding type electrode assembly, the first portion is provided with a connection surface connected to the second portion; and
negative tabs are multiple in quantity, one of the multiple negative tabs protrudes out of the first portion in the winding axial direction and is provided with a first side face close to the second portion, and the first side face and the connection surface are coplanar.

8. The winding type electrode assembly according to claim 6, wherein in the winding axial direction, the negative tab protruding out of the first portion is provided with a negative active material layer, and the negative active material layer on the negative tab protruding out of the first portion is connected to the negative active material layer of the first portion.

9. The winding type electrode assembly according to claim 1, wherein the winding type electrode assembly comprises a straight area and two bent areas, and the two bent areas are connected to two ends of the straight area respectively; and
the first portion passes through the straight area at least two times.

10. The winding type electrode assembly according to claim 1, wherein the negative electrode plate further comprises a third portion, the first portion and the third portion are connected to two ends of the second portion respectively, and the third portion is arranged opposite to the second positive winding end portion; and
a maximum width of a negative active material layer of the third portion is H4, a minimum width of a positive active material layer of the second positive winding end portion is L3, and H4−L3>H2−L2.

11. The winding type electrode assembly according to claim 10, wherein a minimum width of the negative active material layer of the third portion is H5, wherein H4>H2, H5≥H2.

12. The winding type electrode assembly according to claim 1, wherein a maximum width of the positive active material layer of the first positive winding end portion is L4, a maximum width of the positive active material layer of the positive winding middle section is L5, and L4<L5.

13. The winding type electrode assembly according to claim 12, wherein in the winding axial direction, one end of the positive active material layer of the positive winding middle section at least partially exceeds a corresponding end of the positive active material layer of the first positive winding end portion, and the other end of the positive active material layer of the positive winding middle section is flush with the other end of the positive active material layer of the first positive winding end portion.

14. The winding type electrode assembly according to claim 13, wherein the positive electrode plate further comprises a positive tab, in the winding axial direction, the positive tab is located at one end of the positive electrode plate, and one end of the positive active material layer of the positive winding middle section close to the positive tab at least partially exceeds a corresponding end of the positive active material layer of the first positive winding end portion.

15. A battery cell, comprising the winding type electrode assembly according to claim 1.

16. A battery, comprising the battery cell according to claim 15.

17. A power consumption device, comprising the battery cell according to claim 15.

\* \* \* \* \*